(12) United States Patent
Kelly et al.

(10) Patent No.: US 8,949,929 B2
(45) Date of Patent: Feb. 3, 2015

(54) METHOD AND APPARATUS FOR PROVIDING A SECURE VIRTUAL ENVIRONMENT ON A MOBILE DEVICE

(75) Inventors: Charles C. Kelly, San Diego, CA (US); Joshua R. Davis, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 349 days.

(21) Appl. No.: 13/207,134

(22) Filed: Aug. 10, 2011

(65) Prior Publication Data

US 2013/0042295 A1    Feb. 14, 2013

(51) Int. Cl.
| | |
|---|---|
| H04L 29/06 | (2006.01) |
| H04W 12/02 | (2009.01) |
| G06F 21/53 | (2013.01) |
| H04W 12/08 | (2009.01) |

(52) U.S. Cl.
CPC .............. *H04W 12/02* (2013.01); *G06F 21/53* (2013.01); *H04W 12/08* (2013.01)
USPC ...... 726/1; 726/15; 726/19; 726/27; 713/189; 713/194; 455/410; 455/411; 711/6; 718/1

(58) Field of Classification Search
CPC ..... G06F 21/53; H04L 63/10; H04L 67/2852; H04W 12/08
USPC .......................................................... 726/1
See application file for complete search history.

(56) References Cited

U.S. PATENT DOCUMENTS

| | | | |
|---|---|---|---|
| 7,779,252 B2 | 8/2010 | O'brien et al. | |
| 8,468,535 B1* | 6/2013 | Keagy et al. | 718/104 |
| 2004/0163087 A1* | 8/2004 | Sandland et al. | 719/310 |
| 2006/0136667 A1* | 6/2006 | Shultz et al. | 711/118 |
| 2007/0204224 A1 | 8/2007 | Kenagy | |
| 2008/0194296 A1* | 8/2008 | Roundtree | 455/558 |
| 2008/0295180 A1* | 11/2008 | Yoneda | 726/27 |
| 2009/0089569 A1 | 4/2009 | Baribault et al. | |
| 2010/0195833 A1 | 8/2010 | Priestley et al. | |

(Continued)

FOREIGN PATENT DOCUMENTS

| | | |
|---|---|---|
| WO | 2009014975 A1 | 1/2009 |
| WO | 2011007017 A1 | 1/2011 |

OTHER PUBLICATIONS

Hwang et al., "Xen on ARM: System Virtualization using Xen Hypervisor for ARM-based Secure Mobile Phones", 2008, pp. 257-261.*

(Continued)

*Primary Examiner* — Taghi Arani
*Assistant Examiner* — Thaddeus Plecha
(74) *Attorney, Agent, or Firm* — Shirin Tefagh

(57) ABSTRACT

Methods and devices provide a secure virtual environment within a mobile device for processing documents and conducting secure activities. The methods and devices create a secure application environment in which secure data and documents may be segregated from unsecured data using document encryption, allowing the application of security policies to only the secure application environment. The creation of a secure application environment allows users to access and manipulate secure data on any mobile device, not just specifically designated secure devices, without having to secure all data on the mobile device, while providing the corporate entity with necessary document security. The methods and devices provide for securing data on a mobile device at the data level using encryption.

72 Claims, 31 Drawing Sheets

(56) References Cited

U.S. PATENT DOCUMENTS

| | | | |
|---|---|---|---|
| 2010/0199104 A1* | 8/2010 | Van Rijnswou | 713/189 |
| 2010/0323664 A1 | 12/2010 | Sivaram et al. | |
| 2010/0333088 A1* | 12/2010 | Rogel et al. | 718/1 |
| 2011/0145916 A1* | 6/2011 | McKenzie et al. | 726/19 |
| 2012/0233378 A1* | 9/2012 | Elteto | 711/6 |
| 2013/0014039 A1* | 1/2013 | Lachenmann et al. | 715/765 |

OTHER PUBLICATIONS

International Search Report and Written Opinion—PCT/US2012/050440—ISA/EPO—Nov. 29, 2012.

* cited by examiner

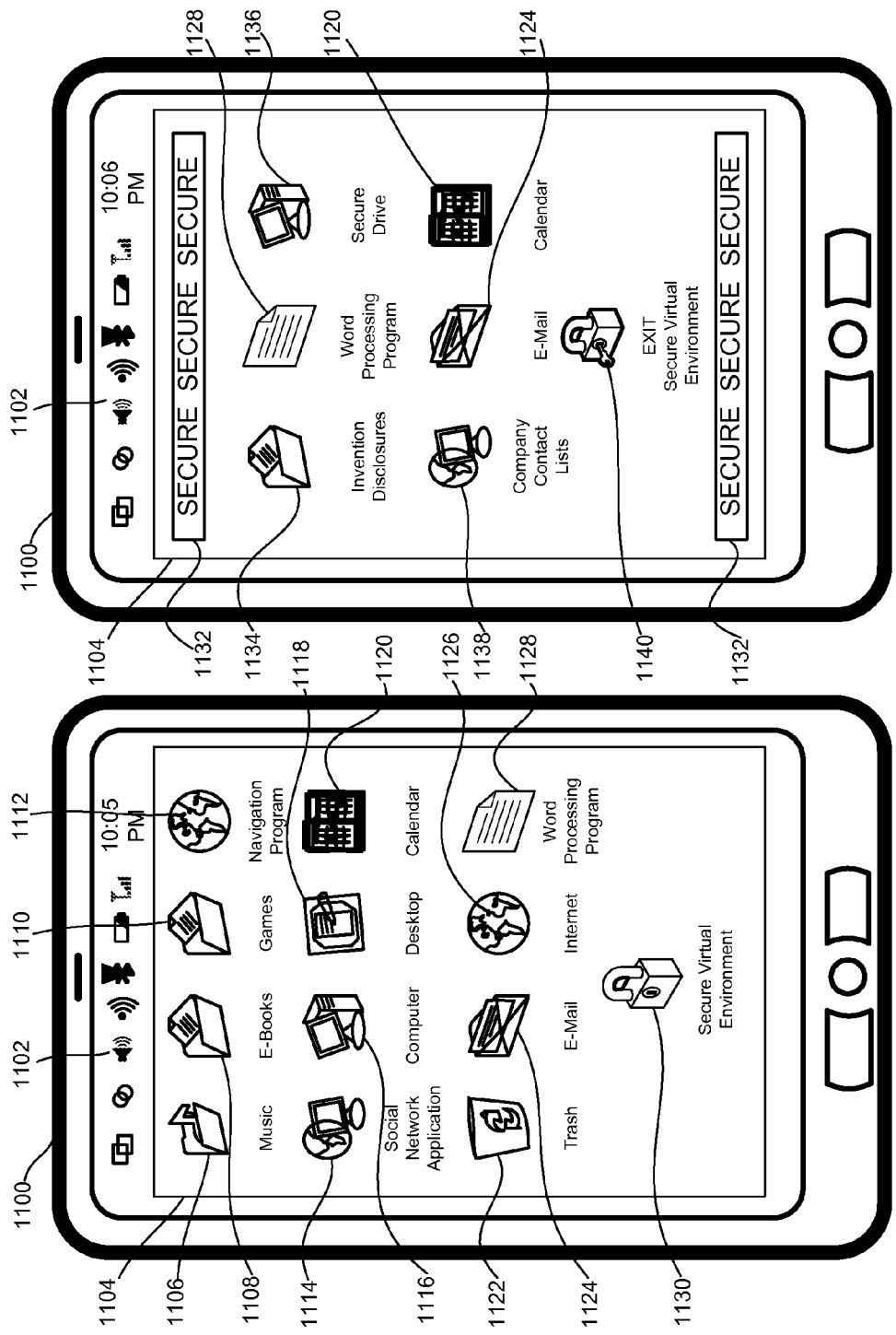

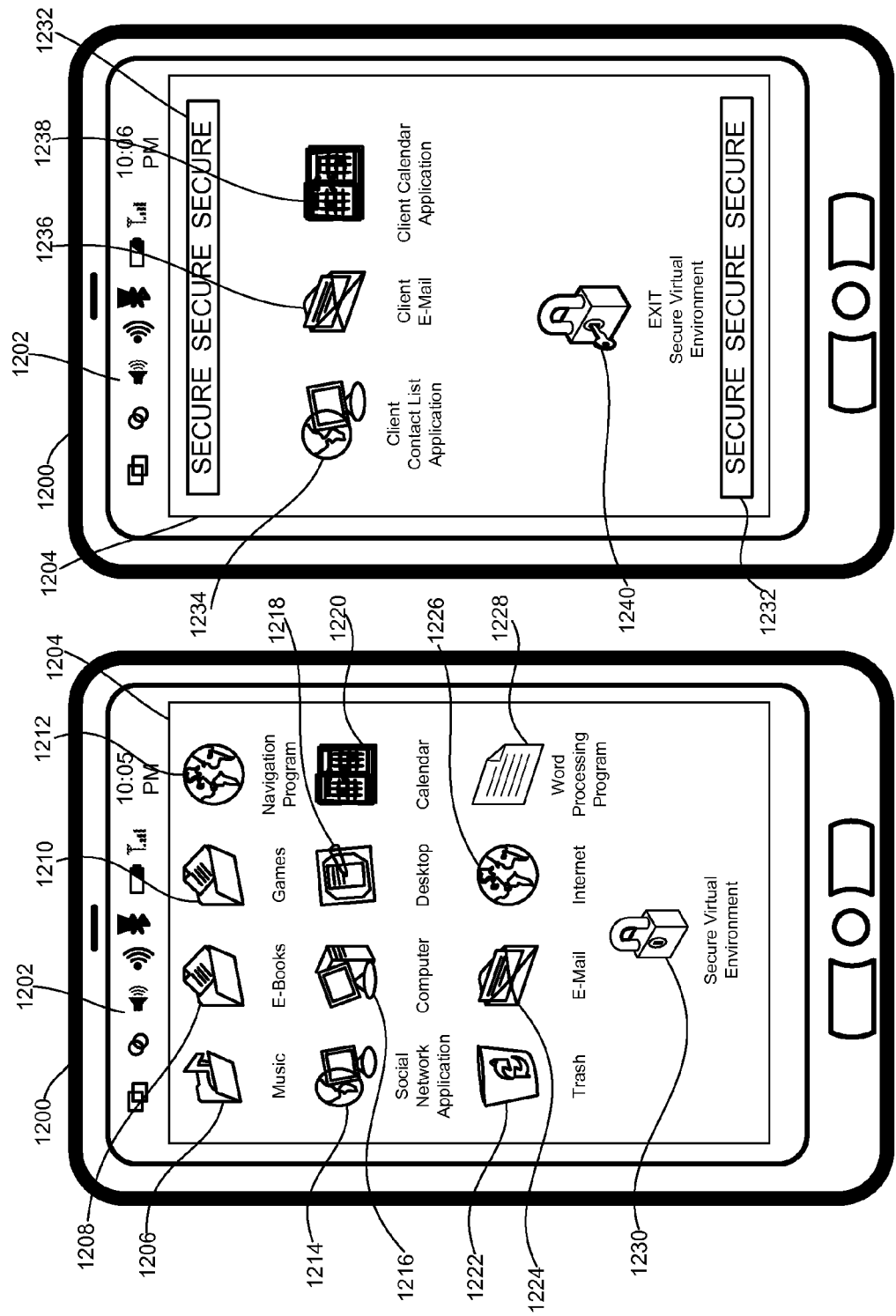

METHOD AND APPARATUS FOR PROVIDING A SECURE VIRTUAL ENVIRONMENT ON A MOBILE DEVICE

FIELD OF THE INVENTION

The present invention relates generally to computing device system architecture and more particularly to methods and systems for providing a secure virtual environment on a mobile device.

BACKGROUND

Information and network security is important to companies, service providers, and governments. All types of data need to be secured, from passwords and e-mails, to documents and data files. The need for security on mobile devices is heightened by their susceptibility to loss or theft. In the past mobile device network security concerns have been addressed by creating independent applications specific to the network to be accessed or by applying security protocols to the entire mobile device. Both approaches are disruptive to device users, and reduce the functionality of mobile devices. Completely stand alone applications have a unique user interface and are designed only for narrow purposes. The stand alone applications allow mobile device users to perform limited functions, and are not integrated with the full capabilities of the mobile device. The current alternative of applying security protocols to the entire mobile device poses a risk to any personal data that is on the mobile device. Users dislike this approach because their mobile devices become dedicated to the single purpose, the secured network, and cannot be used for personal matters.

SUMMARY

The various aspects provide a secure virtual environment within a mobile device for processing documents and conducting secure activities. The aspect methods create a secure application environment in which secure data and documents may be segregated from unsecured data on a mobile device using document encryption, allowing the application of security policies to only the secure application environment. The creation of a secure application environment allows mobile device users to access and manipulate secure data on any mobile device, not just specifically designated secure devices, without having to secure all data on the mobile device, while providing the corporate entity with necessary document security.

The methods and devices of the various aspects provide for securing data on a mobile device by starting a secure application on the mobile device, using the secure application to encrypt any data manipulated using the secure application, and storing the data manipulated using the secure application in encrypted form on the mobile device.

BRIEF DESCRIPTION OF THE DRAWINGS

The accompanying drawings, which are incorporated herein and constitute part of the specification, illustrate exemplary aspects of the invention. Together with the general description given above and the detailed description given below, the drawings serve to explain features of the invention.

FIGS. 10A and 10B are block diagrams of a mobile device embodying aspects of a secure virtual environment.

FIGS. 11A and 11B are block diagrams of a mobile device embodying aspects of a secure virtual environment.

DETAILED DESCRIPTION

Figure 1A:
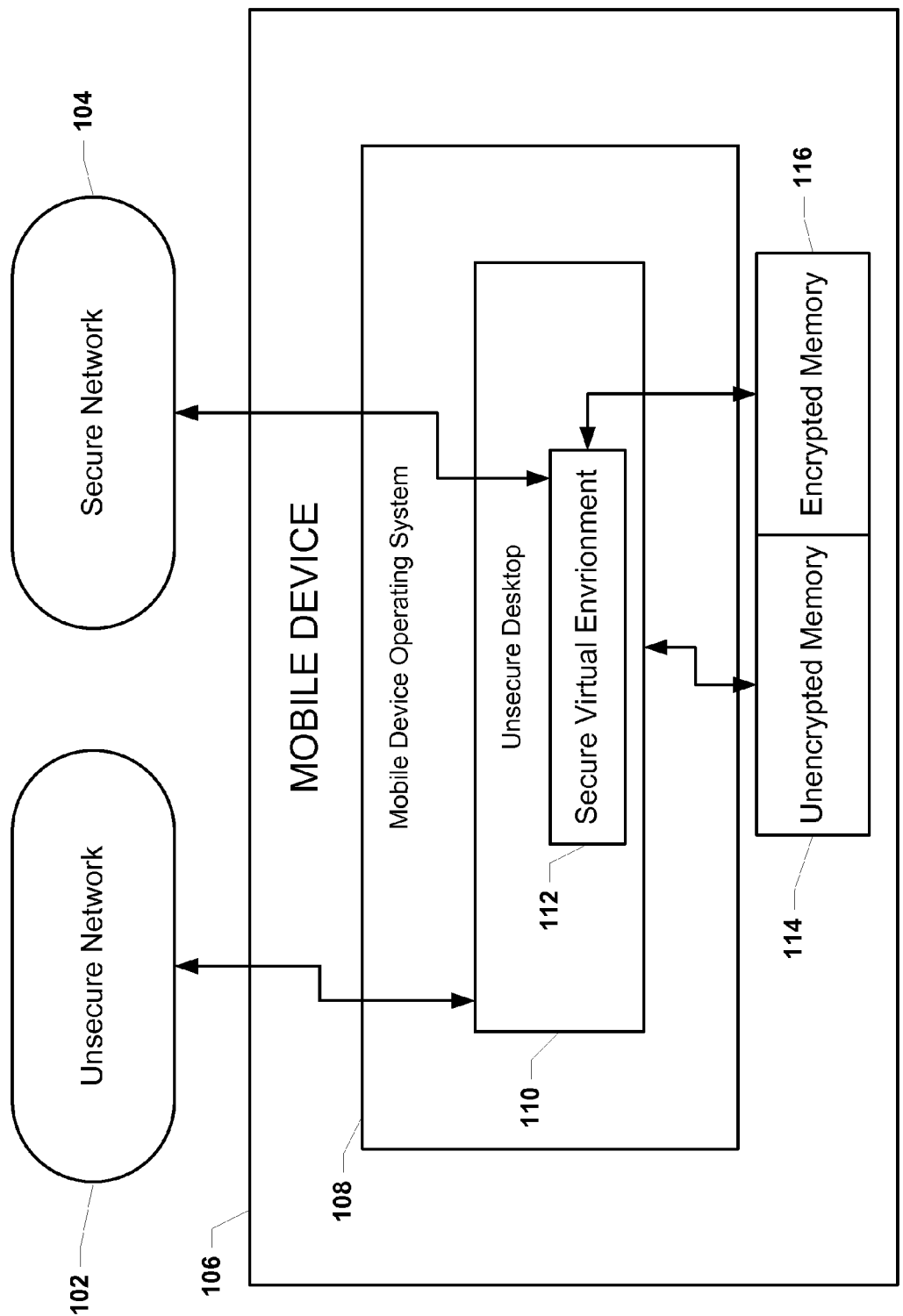
FIGS. 1A through 1C are functional block diagrams of modules of a mobile device according to various aspects.

The various aspects will be described in detail with reference to the accompanying drawings. Wherever possible, the same reference numbers will be used throughout the drawings to refer to the same or like parts. References made to particular examples and implementations are for illustrative purposes and are not intended to limit the scope of the invention or the claims.

The word "exemplary" is used herein to mean "serving as an example, instance, or illustration." Any implementation described herein as "exemplary" in not necessarily to be construed as preferred or advantageous over other implementations.

As used herein, the term "mobile device" refers to any one or all of cellular telephones, personal television receivers, personal data assistants (PDAs), palm-top computers, notebook computers, personal computers, wireless electronic mail receivers and cellular telephone receivers (e.g., the Blackberry® and Treo® devices), multimedia Internet enabled cellular telephones (e.g., Blackberry Storm®), multimedia enabled smart phones (e.g., Android® and Apple iPhone®), and similar electronic devices that include a programmable processor, memory, a communication transceiver, and a display.

As used herein, the term "corporate entity" refers to any business, corporation, government, individual, or other entity which may desire to set security policy for a mobile device.

Information and network security is important to companies, service providers, and governments. All types of data need to be secured, from passwords and e-mails to documents and data files. The need for security on mobile devices is heightened by the fact that mobile devices are frequently lost or stolen. The various aspects provide a secure virtual environment within a mobile device for processing documents and conducting secure activities that secures documents enabling use of the devices for non-secure and personal uses. The aspect methods create a secure application environment in which secure data and documents are segregated from unsecured data on a mobile device through encryption and controlled decryption, allowing the application of security policies to only the secure application environment. The creation of a secure application environment allows mobile device users to access and manipulate secure data on any mobile device, not just specifically designated secure devices, without having to secure all data on the mobile device and while providing the corporate entity with necessary document security.

In overview, the methods and devices of the various aspects create a remotely-manageable secure virtual environment on a mobile device. This secure virtual environment may be implemented as an application, as a module within another application (e.g., a word processing application), or as part of the device operating system on a mobile device. When the secure virtual environment is started, the user authenticates himself or herself to the secure virtual environment, such as by entering a username, password, secure key, and/or biometric data. Once the user is authenticated, the secure virtual environment enables the user to access, manipulate, receive and store secure documents and data using a variety of applications operating within, or in conjunction with, the secure virtual environment. The secure virtual environment segregates all data viewed, manipulated, or created in the secure virtual environment from all other data on the mobile device by applying encryption/decryption of data in the secure virtual environment. Secured data on the device is stored in encrypted format. The secure virtual environment decrypts the data when viewed by the authenticated user in the secure virtual environment, such as when an application opens a secured document. When the user is finished with the data, the secure virtual environment re-encrypts the data for storage on the mobile device. In this manner, secure and unsecure data may reside on the mobile device, because the secure data will be encrypted when not accessed, and such data may only be accessed via the secure virtual environment. In the event the mobile device is lost or stolen, secure data is protected because it always resides in encrypted form when not in use.

In another aspect, the secure virtual environment may serve as a communication gateway between a mobile device and secure networks. When the secure virtual environment is launched and the user has been authenticated, the secure virtual environment interfaces with any communication networks, domains, or applications to automatically provide the user's credentials to those networks, domains, or applications. By serving as the gateway for secure access, the user need not log in separately to each network, domain, or application they wish to use. This aspect enables users to access their secure company email and maintain secure email system data (e.g., message, calendars, contact lists, etc.) on their mobile device, since such data will be encrypted when the secure virtual environment is not running. Encrypted communications may be accomplished by another application, such as a virtual private network (VPN) application, or optionally, may also be provided by the secure virtual environment.

In another aspect, the secure virtual environment may leverage a secure hardware zone within the processor of the mobile device. Many mobile devices use processors that feature a secure hardware zone, often implemented as a segmented area of a chip set, that has specific security protocols or encryption applied to only that area. The secure virtual environment may run exclusively in the secure hardware zone on the mobile device, and/or store data exclusively to a secure hardware zone. In this aspect, the secure virtual environment may take advantage of and run within the application program interfaces (APIs), instructions, data segregations and other provisions of the secure hardware zone.

In another aspect, the secure virtual environment provides or enables an API/broker that allows software vendors to configure their programs, applications, or widgets to interface with the secure virtual environment. This secure API/broker allows software vendors to create software that may be "trusted" by the secure virtual environment. This enables vendors to provide applications that allow users to enjoy the full functionality of any trusted programs within the secure virtual environment. This secure interaction between multiple software applications allows networks to set security protocols regardless of the applications or the types of mobile devices on which the applications are run.

In an aspect, the secure virtual environment presents a secure virtual desktop when started. This desktop may look and function like the standard desktop for the mobile device, but may only present the user with applications, and functions, enabled or supported by the security protocols applied by the security settings. By presenting a nearly similar desktop, the user's interaction with the mobile device is not altered, and the application of security protocols to the device is less burdensome to the user since they do not need to learn to navigate a new graphical user interface (GUI). Additionally, the user may switch back and forth between the secure virtual desktop and the standard desktop at will.

Figure 1B:
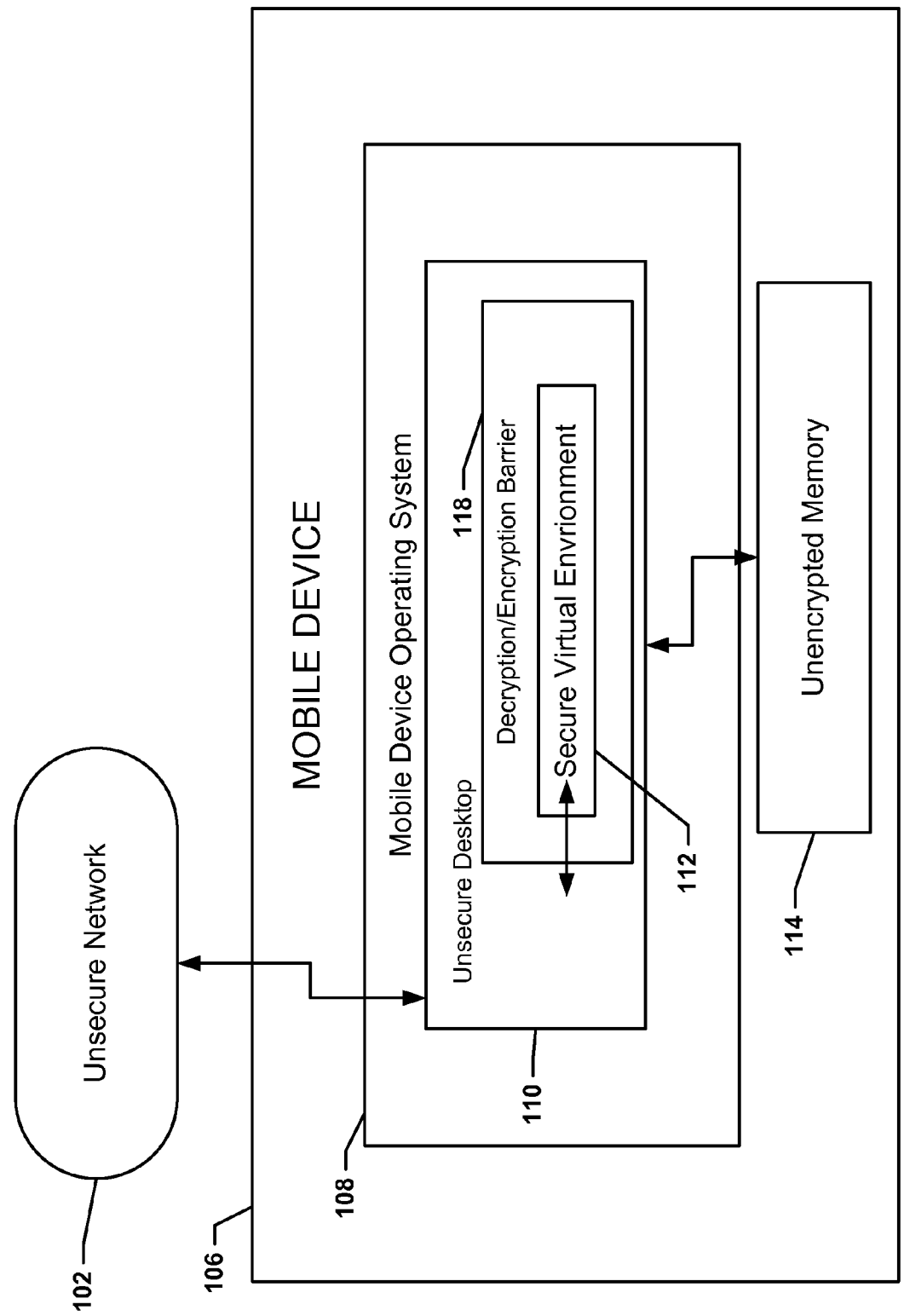
Figure 1C:
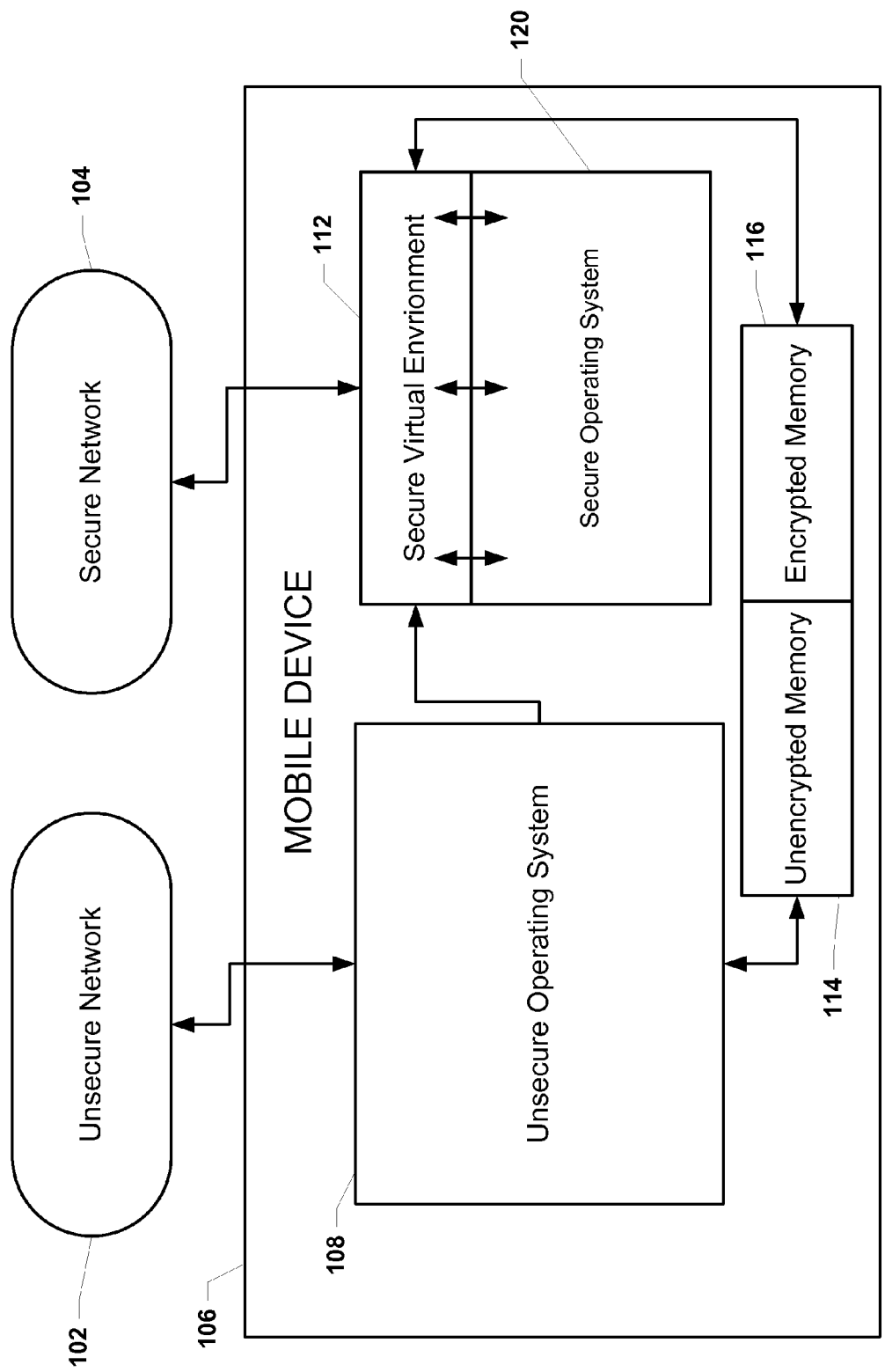

Example aspects of a mobile device configured to present a secure virtual environment are shown in FIGS. 1A through 1C. FIG. 1A illustrates an unsecure network 102 and a secure network 104 in communication with a mobile device 106. The communications between the mobile device 106 and each of the networks 102 and 104 may be by any known data communication link including wired local area networks (LAN), the Internet, cellular networks, Wi-Fi, GSM, and PCS to name just a few. The mobile device 106 may be configured with a mobile device operating system 108 which provisions an unsecure desktop 110, to a user and a secure virtual environment 112 that operates inside the unsecure desktop 110. Data from the unsecure network 102 flows between the unsecure network 102 and the unsecure desktop 110. Data from the secure network 104 flows between the secure network 104 and the secure virtual environment 112. Because the secure virtual environment 112 is created within the unsecure desktop 110 of the mobile device operating system 108, encrypted data from the secure network 104 may pass through the mobile device operating system 108 and the unsecure desktop 110 to arrive at the secure virtual environment 112. However, only the secure virtual environment 112 is capable of decrypting the data received from the secure network 104. Further, once manipulation of secure data is finished, the data is encrypted before being stored in a device memory. In this manner, data from the unsecure network 102 and the secure network 104 remain segregated via encryption.

In an optional aspect, the mobile device 106 may be configured with two memory portions; an unencrypted memory 114 and an encrypted memory 116. The memory portions may be distinct portions of a single memory or may be separate physical memory devices. The unencrypted memory 114 maybe in communication with the unsecure desktop 110. The encrypted memory 116 maybe in communication with the secure virtual environment 112. In this manner data from the secure virtual environment 112 is only stored in the encrypted memory 116, and data from the unsecure desktop 110 is only stored in the unencrypted memory 114.

Regardless of whether secure data is stored in the same memory as is unsecured data or the two types of data are physically separated, only the secure virtual environment 112 may decrypt and read or encrypt and store data and communicate with the secure network 104. This ensures secure data is protected at all times on the mobile device 106. The unsecure desktop 110 may read and write unsecure data and communicate with the unsecure network 102 in the ordinary manner familiar to the user.

FIG. 1B illustrates another aspect similar to FIG. 1A. In FIG. 1B the mobile device 106 is in communication with only an unsecure network 102. In this aspect both secure and unsecure data may flow between the mobile device 106 and the unsecure network 102. In this situation, secure data may be encrypted and encapsulated in packets for delivery via the network using virtual private network (VPN) or similar technology in order to protect the secure data. Data received by the mobile device 106 passes to the mobile device operating system 108 and the unsecure desktop 110. Unsecure data may be sent and received unencrypted (even if it is encrypted by VPN during transmission), and therefore may be manipulated in the unsecure desktop 110. The unsecure desktop 110 may both read and write data to the single memory 114 on the mobile device 106. Inside the unsecure desktop 110 may be a decryption/encryption module 118 which only allows encrypted data to pass to the unsecure desktop 110. The decryption/encryption module 118 may be a sub-application or program element of the secure virtual environment 112 that configured to encrypt and decrypt data. The data encryption/decryption module 118 decrypts data entering the secure virtual environment 112 and encrypts data leaving the secure virtual environment 112. The decryption/encryption module 118 thus serves as a gatekeeper, only allowing encrypted, and therefore secure, data to be saved by the secure virtual environment 112. Additionally, the decryption/encryption module 118 serves to encrypt all data leaving the secure virtual environment. The encrypted data may enter the decryption/encryption module 118 from the unsecure desktop 110, where it is decrypted and passed to the secure virtual environment 112. The secure virtual environment 112 may then manipulate the secure data, and pass the data back to the decryption/encryption module 118 to be encrypted before it leaves the secure virtual environment. The encrypted data may be passed from the decryption/encryption module 118 to the unsecure desktop 110 to be stored in the unencrypted memory 114 or passed to the unsecure network 102. In this manner secure and unsecure data may flow across an unsecure network 102 and be stored in unencrypted memory 114, because secure data will always be encrypted at the data level while not being manipulated in the secure virtual environment 112. The constant encryption of the secure data outside the secure virtual environment 112 protects the data, regardless of the nature of the network or memory on the mobile device 106.

FIG. 1C illustrates an aspect in which the mobile device 106 has two operating systems, an unsecure operating system 108 and a secure operating system 120. The unsecure operating system 108 may be in communication with an unsecure network 102 and an unencrypted memory 114. In this aspect, the secure operating system 120 may be in communication with a secure virtual environment 112. The secure virtual environment 1012 acts as a gatekeeper, ensuring only secure data enters and exits the secure operating system 120. The secure virtual environment 112 may be in communication with a secure network 104, an encrypted memory 116, and the unsecure operating system 108. The secure virtual environment 112 may transmit to or receive data from the secure network 104, and read data from and write data to the encrypted memory 116. The secure virtual environment 112 may receive data from the unsecure operating system 108. Unsecure data maybe unencrypted and may only be manipulated by the unsecure operating system 108. Secure data, which is encrypted when received, may be received at the unsecure operating system 1008 via the unsecured network 1002. If encrypted data is received by the unsecure operating system 108, the unsecure operating system 108 may pass the encrypted data to the secure virtual environment 112. Secure data received via the secure network 104 in the secure virtual environment 112 may be stored in encrypted format. The secure virtual environment 112 decrypts the secure data received from the unsecure operating system 108, the encrypted memory, or the secure network 104 and passes the decrypted data to the secure operating system 120. The applications running within the secure operating system 120 may then manipulate the decrypted secure data. Data from applications running within the secure operating system 120 may be passed to the secure virtual environment 112 to be encrypted before transmission to the secure network 104 or storage in the encrypted memory 116. In this manner, the secure virtual environment 112 ensures that outside the secure operating system 120 secure data is always encrypted.

Figure 2:
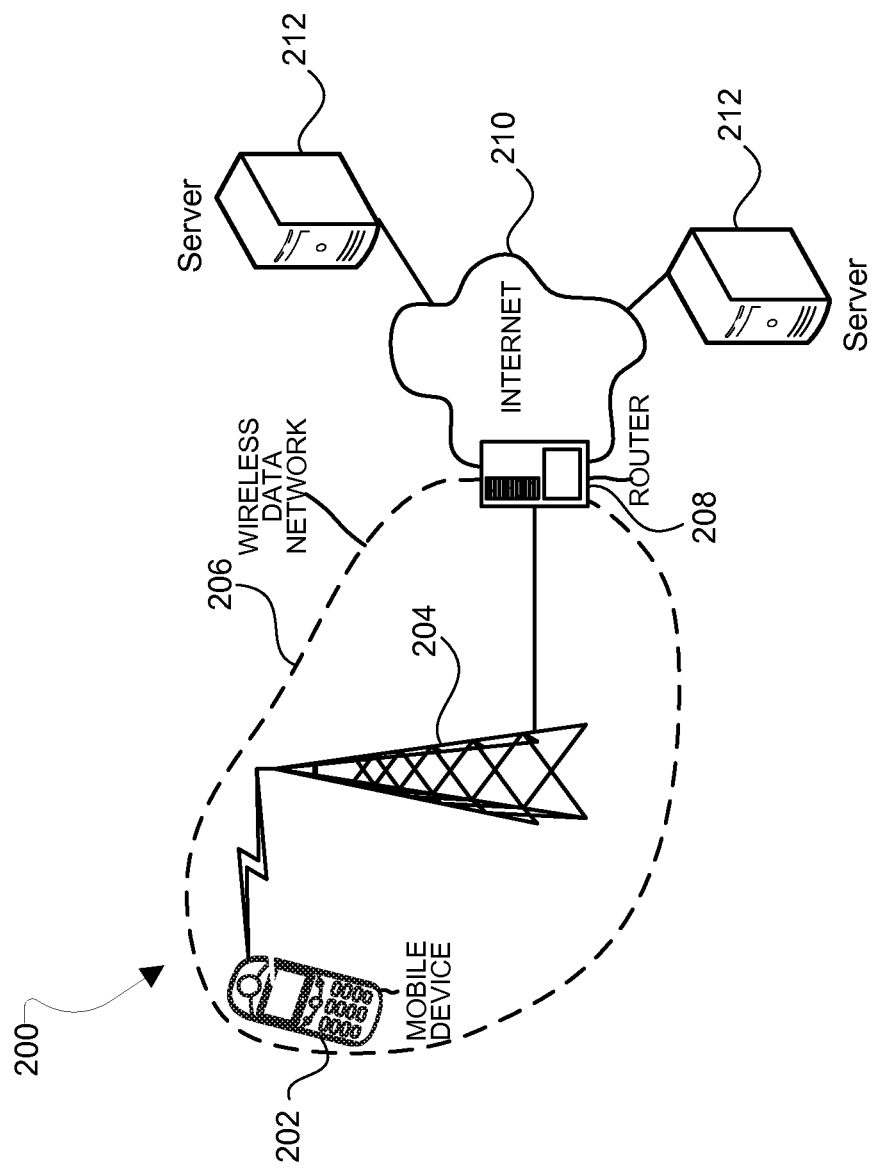
FIG. 2 is a communication system block diagram of a wireless network suitable for use with various embodiments.

FIG. 2 illustrates a wireless network system 200 suitable for use with the various aspects. At least one mobile device 202 and a wireless transmitter/receiver 204 together make up a wireless data network 206. Using the wireless data network 206, data may be transmitted wirelessly between the mobile device 202 and the wireless cell tower or base station 204. The transmissions between the mobile device 202 and wireless cell tower or base station 204 may be by any cellular networks, including Wi-Fi, CDMA, TDMA, GSM, PCS, G-3, G-4, LTE, or any other type connection. The wireless network 206 is in communication with a router 208 which connects to the Internet 210. In this manner data may be transmitted from/to the mobile device 202 via the wireless network 206, and router 208 over the Internet 210 to/from a server 212 by methods well known in the art. The wireless network 206 and servers 212 may be secure or unsecure. While the various aspects are particularly useful with wireless networks, the aspects are not limited to wireless networks and may also be implemented over wired networks with no changes to the methods.

Figure 3B:
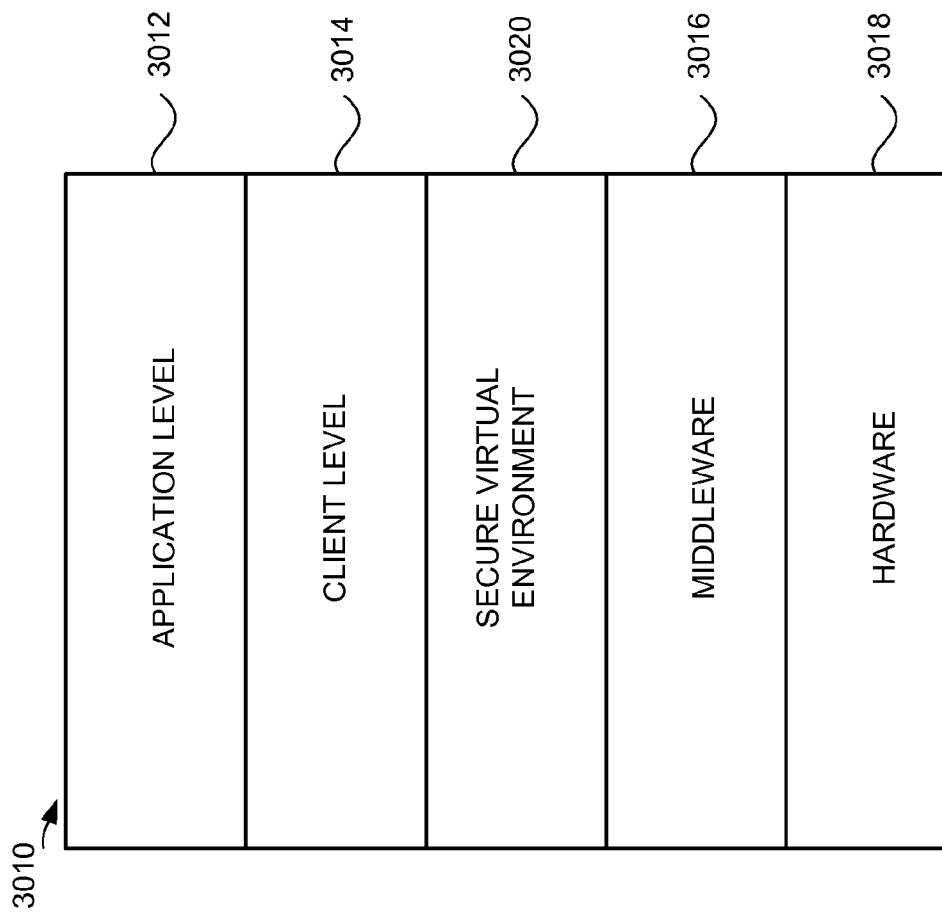
FIGS. 3A and 3B are software architecture diagrams of networks.
Figure 3A:
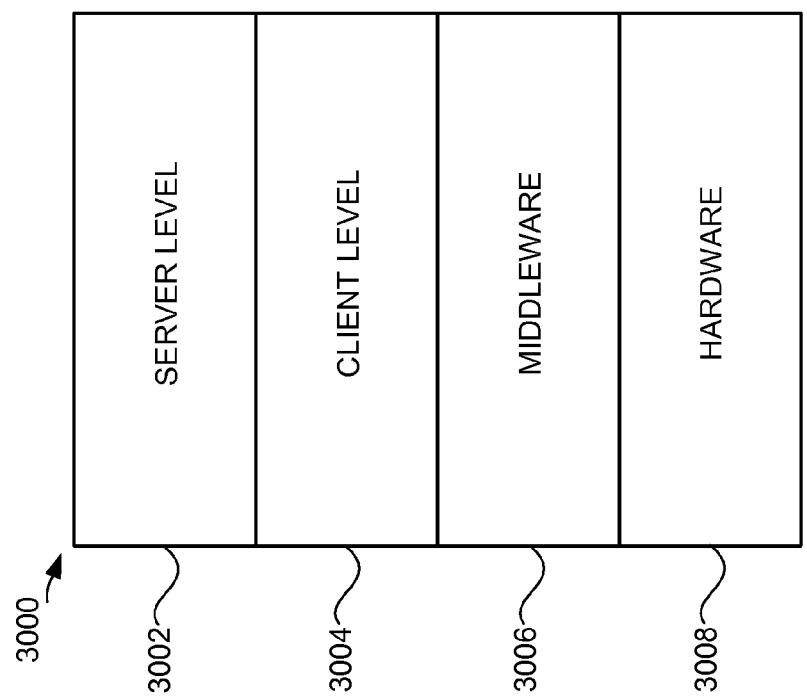

FIGS. 3A and 3B illustrate software architectures of the server and mobile device, respectively. FIG. 3A illustrates a software architecture of a network 3000 well known in the art. The software architecture of a network 3000 includes server level applications 3002, a client level 3004, middleware 3006, and a hardware layer 3008. FIG. 3B illustrates a software architecture of a mobile device 3010 employing an aspect secure virtual environment. The levels include an application level 3012, a client level 3014, a secure virtual environment 3020, middleware 3016, and a hardware layer 3018.

Figure 4A:
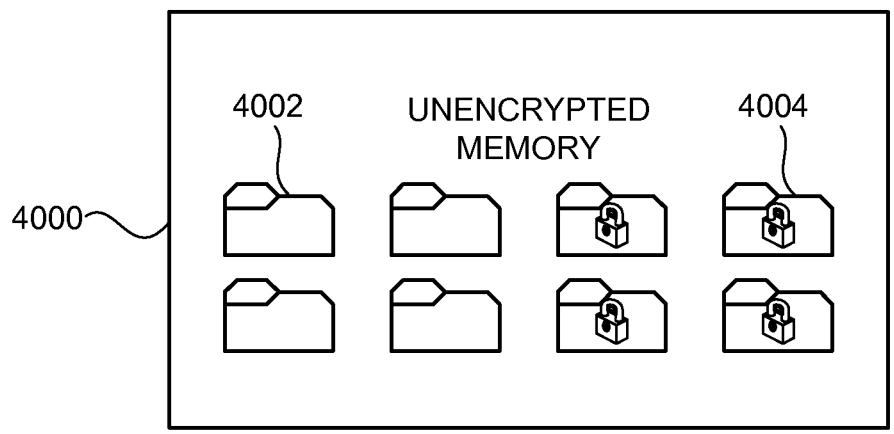
FIGS. 4A and 4B are memory structure diagrams according to various aspects.
Figure 4B:
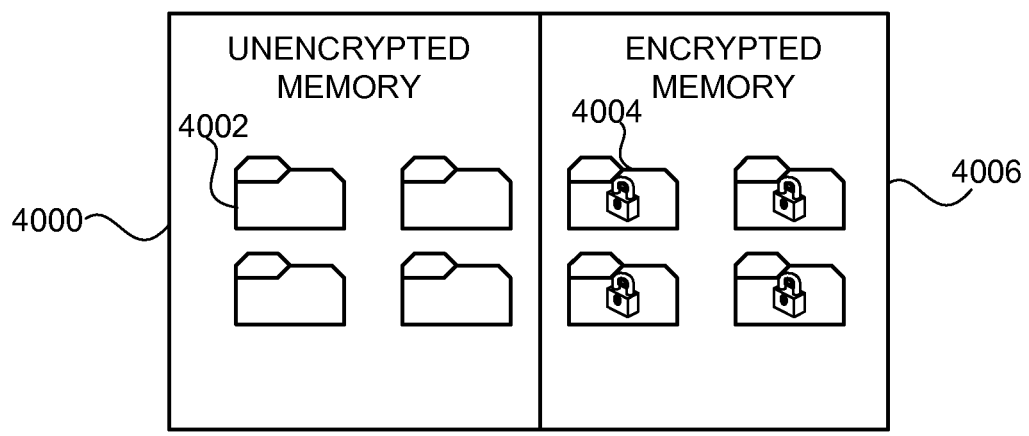

FIGS. 4A-4B illustrate different embodiment mobile device memory structures that may be used in various aspects. FIG. 4A illustrates an embodiment including a single unencrypted memory 4000 on a mobile device. In this embodiment unsecure data 4002 and secure data 4004 may be stored in the same unencrypted memory 4000. Secure data 4004 is protected by being encrypted at the data level. Thus, though the total contents of the unencrypted memory 4000 may be accessed without security or encryption, the secure data 4004 will remain protected by its independent encryption.

FIG. 4B illustrates an embodiment mobile device memory having two parts, an unencrypted memory 4000 and an encrypted memory 4006. In this embodiment, the mobile device memory may be a single physical memory segregated into an unencrypted memory portion 4000 and an encrypted memory portion 4006, or may be two independent memory structures. In this embodiment, secure data 4004 is encrypted at the data level before being sent to the encrypted memory 4006, but is further protected because the encrypted memory 4006 further encrypts the secure data 4004. Only secure data 4004 is sent to the encrypted memory 4006. The unsecure data 4002 resides in the unencrypted memory 4000, and neither the unsecure data 4002 nor the unencrypted memory 4000 may be subject to encryption. In this embodiment, a dual layer of security is provided to the secure data 4004. If the first layer of encryption provided by the encrypted memory 4006 is compromised, the individual data elements that are the secure data 4004 may be also independently encrypted providing a second layer of security.

Figure 5:
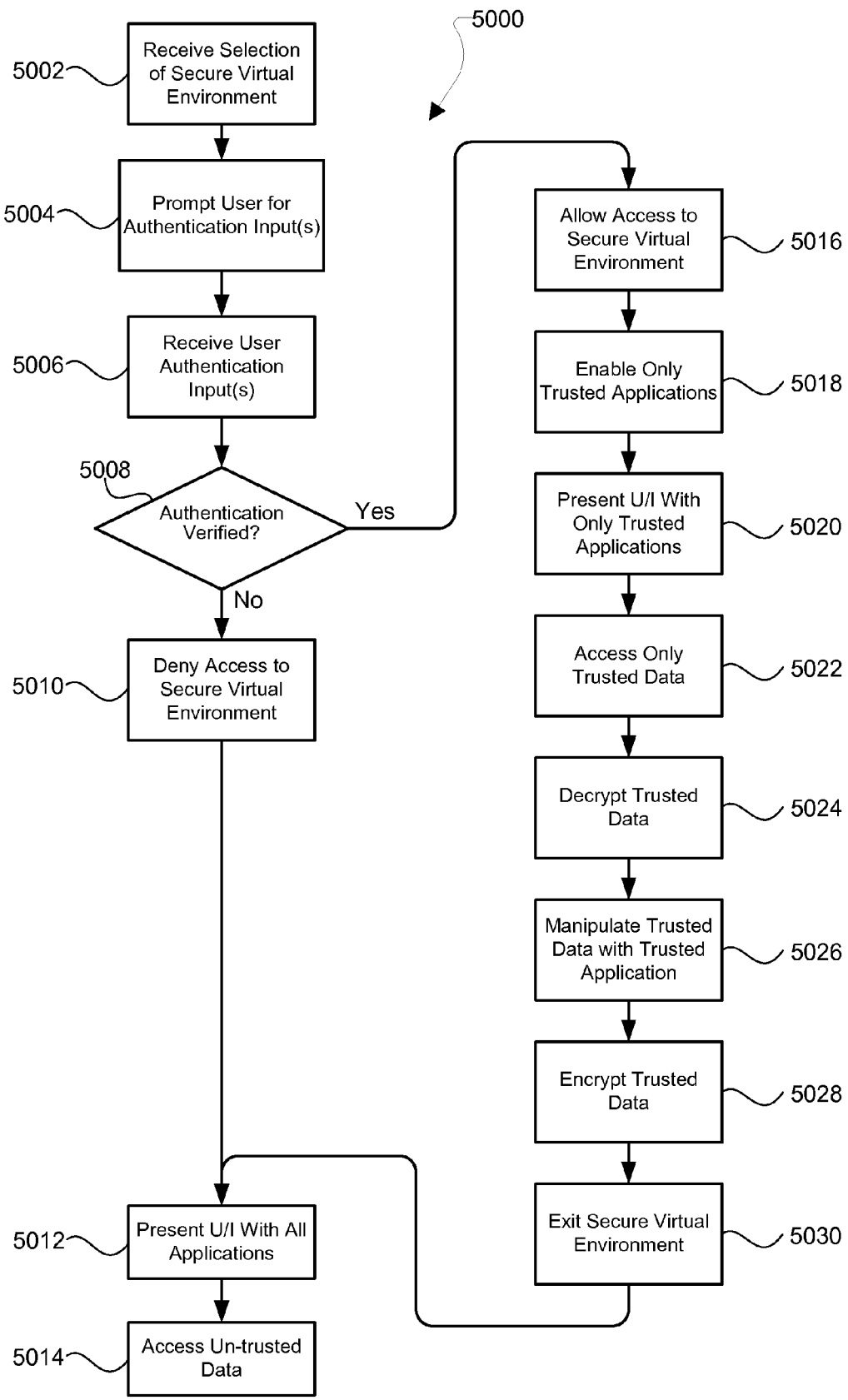
FIG. 5 is a process flow diagram illustrating an aspect method for implementing a secure virtual environment on a mobile device.

FIG. 5 illustrates an embodiment 5000 for implementing a secure virtual environment on a mobile device. This method 5000 may be implemented within a processor of a mobile device by configuring the processor with suitable processor-executable instructions to perform the operations of the method. In block 5002, the mobile device may receive a user request for activation of the secure virtual environment. This user input may be in the form of a user touching or clicking on an icon on the mobile device desktop, a drop down menu, or via any other selection method. In block 5004, the processor implementing the secure virtual environment prompts the user to provide authentication inputs. In the operation the user may be prompted to provide a variety of authentication inputs, including user ID, password, biometric data, secure key, or any combination thereof. In block 5006, the processor receives the user requested authentication information. In determination block 5008, the processor implementing the secure virtual environment compares the provided authentication information to authentication information stored in memory. This may involve comparing the provided authentication information to authentication information stored in a table of authorized users. Any known method for authenticating individuals to a computing device may be used. If the authentication information is not verifiable (i.e., determination block 5008="No"), in block 5010 access may be denied to the secure virtual environment. As part of block 5010, the processor may terminate the secure virtual environment. Also, in some implementations the user may be afforded another opportunity to authenticate him or herself, such as by returning to step 5004. At block 5012 an unauthenticated user may be presented with a user interface providing access to all applications except those unique to the secure virtual environment. At block 5014 the user may be allowed to access un-trusted data stored within the mobile device.

If, however, at block 5008 the secure virtual environment authenticates the user (i.e., determination block 5008="Yes"), at block 5016 the secure virtual environment grants access to the user. At block 5018, the secure virtual environment enables those applications considered by the corporate protocol or user settings to be trusted applications. At block 5020, the user may be presented with a user interface displaying only trusted applications. At block 5022, the user is allowed to only access trusted data with the trusted applications via the secure virtual environment. At block 5024, trusted data accessed in the secure virtual environment may be decrypted from its storage state. At block 5026, the user views and manipulates the trusted data with one or more trusted applications.

At block 5028, the trusted data may be encrypted by the secure virtual environment before being transmitted or stored. In this way, secure data may not be in unencrypted form outside the confines of the secure virtual environment. At block 5030, the mobile device may receive a user request to exit the secure virtual environment. This user input may be in the form of a user touching or clicking on an icon on the mobile device desktop, a drop down menu, or via any other selection method. Additionally, the processor may be configured to automatically exit the secure environment in response to certain defined conditions, such as inactivity (e.g., no user inputs received within a threshold duration), the device entering a sleep mode, the device entering or exiting a defined geographic boundary (as may be determined by GPS or cell tower ID), the device experiencing damage (e.g., an acceleration exceeding a threshold value) or physical modification (e.g., breaking of a tamper seal), or other indications of an event warranting protection of secure data.

When the processor implementing the secure virtual environment receives the user request to exit the secure virtual environment, the processor encrypts any open secured data and closes the secure virtual environment. At block 5012 a user may be presented with a user interface with all applications except those unique to the secure virtual environment. At block 5014 the user may be allowed to access un-trusted data with the mobile device.

Figure 6A:
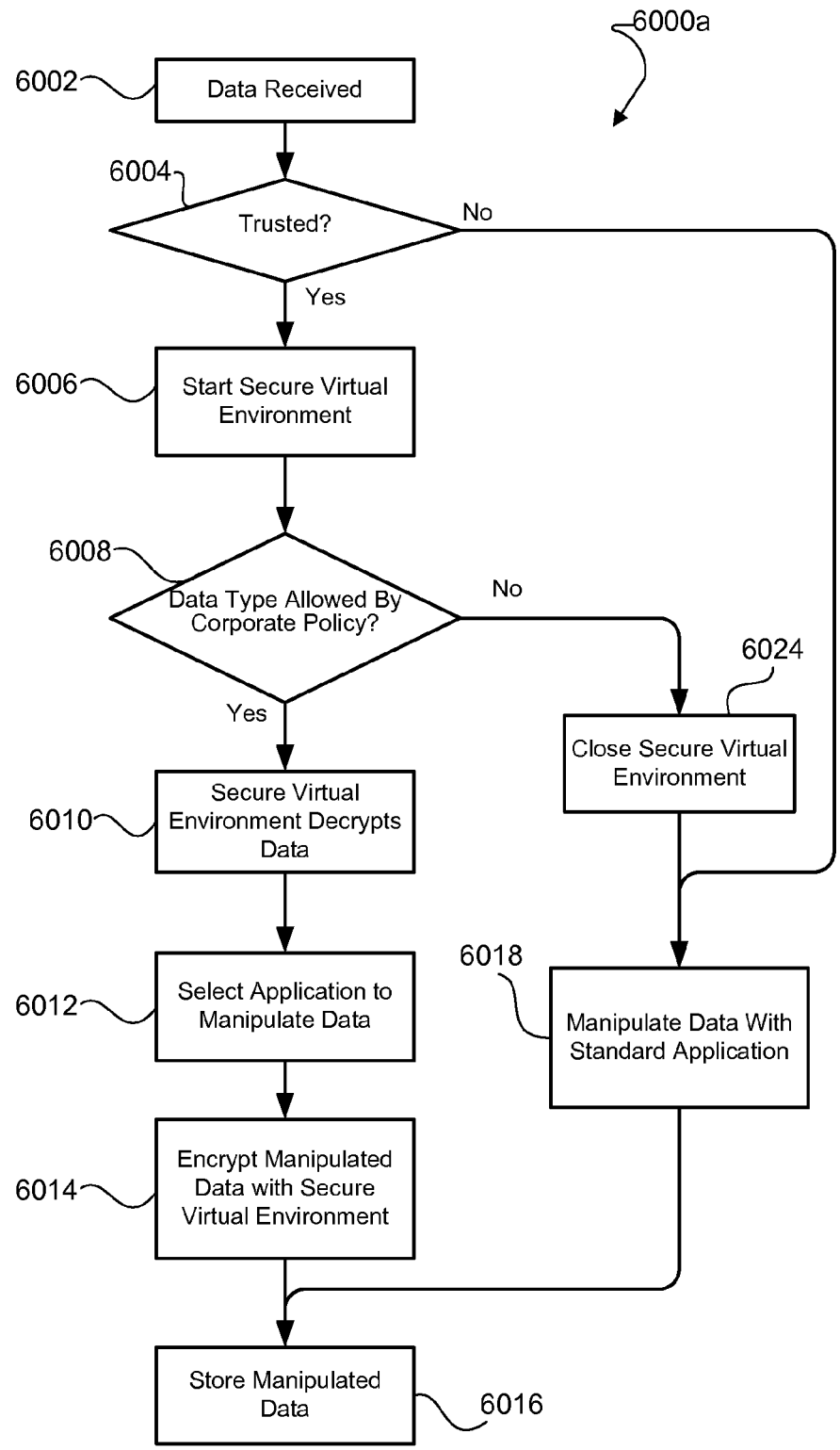
FIGS. 6A and 6B are process flow diagrams of aspect methods for interacting with data received at a mobile device employing a secure virtual environment.
Figure 6B:
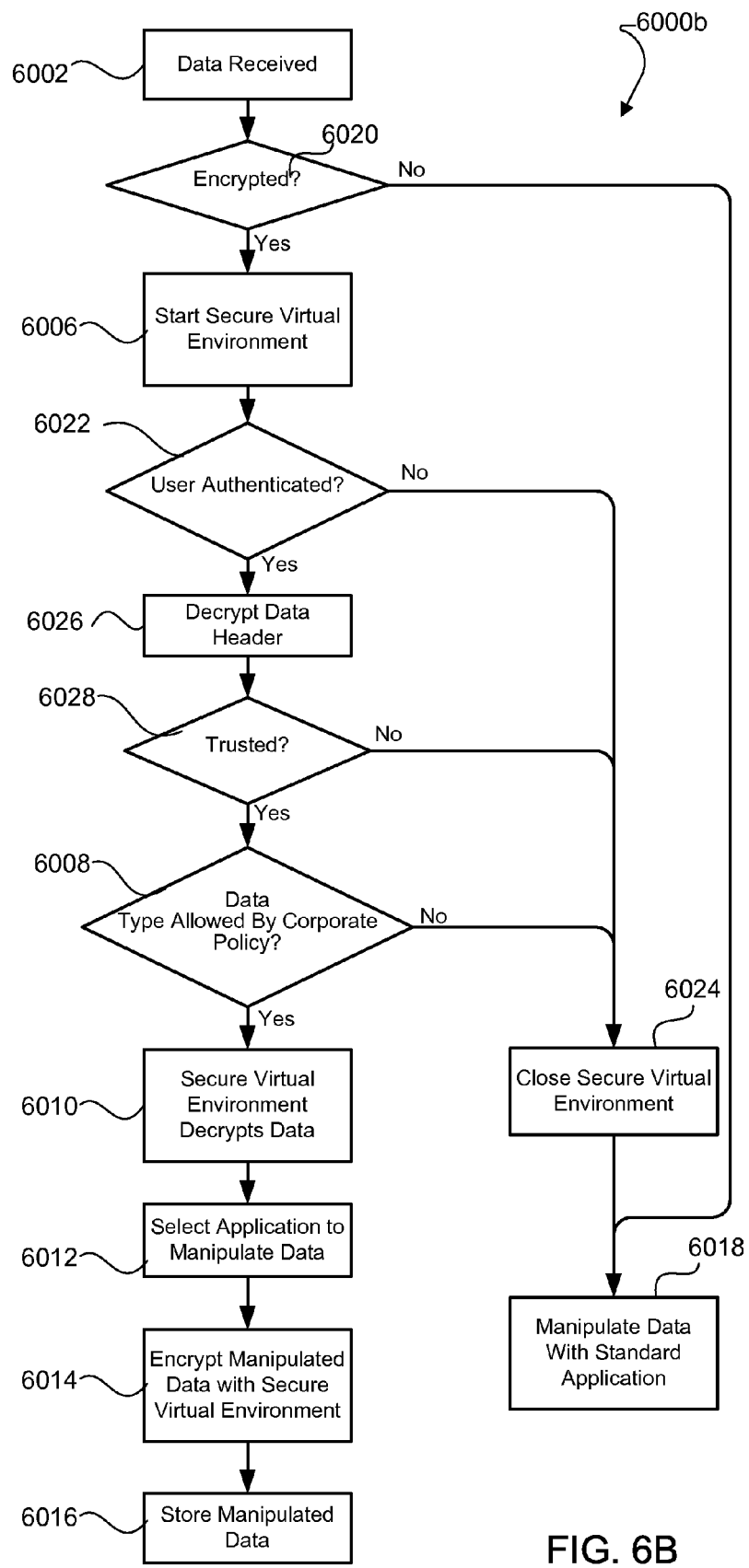

FIGS. 6A and 6B illustrate an embodiment 6000a and 6000b for interacting with data received at a mobile device using a secure virtual environment. Methods 6000a and 6000b may be implemented within a processor of a mobile device by configuring the processor with suitable processor-executable instructions to perform the operations of the method. In FIG. 6A in block 6002, data may be received at the mobile device, such as via a wireless or wired communication link. In determination block 6004, the mobile device may determine if the data is trusted. If the data is untrusted (i.e., determination block 6004="No"), at block 6018 the data may only be manipulated with a standard application, and at block 6016 the manipulated data may be stored on the mobile device is unencrypted format. If the data is determined to be trusted (i.e., determination block 6004="Yes"), at block 6006 the secure virtual environment may be started. At determination block 6008 the secure virtual environment may apply corporate policy and/or user settings and determine if the data type is allowed. Data types may include file formats, such as .pdf or .jpg, or executable files, or any other type into which data may be categorized. Allowed data types may be listed in an allowed data type table. If the data type is not allowed by the corporate policy and/or user settings (i.e., determination block 6008="No"), at block 6024, the secure virtual environment closes, and the data may be manipulated at block 6018 using a standard application. At block 6016 the manipulated data may be stored on the mobile device.

If the data type is allowed by corporate policy and/or user settings (i.e., determination block 6008="Yes"), at block 6010 the secure virtual environment decrypts the data. At block 6012, an application may be selected to manipulate the data. In an optional embodiment, the application selected may be a trusted application specifically authorized to operate in the secure virtual environment. The selection of the application at block 6012 may be independently made by the processor of the mobile device, made by the processor in response to a received user input to the mobile device, or by some combination of the two. When the user finishes with the data and closes the file, at block 6014, the secure virtual environment encrypts the manipulated data, and at block 6016 the manipulated data may be stored on the mobile device. By encrypting the data at block 6014 no data is allowed outside the secure virtual environment in an unencrypted form. In the event the secure data is only viewed and is not indicated for saving (e.g., by a user input or a document policy included in the data), the secure data may just be deleted from memory in which case operations at blocks 6014 and 6016 would not be performed.

FIG. 6B illustrates an alternative embodiment 6000*b* for interacting with data received at a mobile device using a secure virtual environment. This method 6000*b* may be implemented within a processor of a mobile device by configuring the processor with suitable processor-executable instructions to perform the operations of the method. In FIG. 6B, the method 6000*b* further employs data headers to identify data as being secure. At block 6002 data may be received at the mobile device as discussed above. The mobile device determines if the data is encrypted at determination block 6020. If the data is unencrypted (i.e., determination block 6020="No"), at block 6018 the data may be manipulated with a standard application.

If the data is determined to be encrypted (i.e., determination block 6020="Yes"), the secure virtual environment may be started at block 6006. At determination block 6022 the secure virtual environment may attempt to authenticate the user. This may be done by prompting the user to provide authentication inputs such as a password, user ID, secure key, or biometric data, or any combination thereof. If the user cannot be verified (i.e., determination block 6022="No"), at block 6024 the secure virtual environment closes, and at block 6018 the data may be manipulated with a standard application. At block 6018 the encrypted data may be manipulated in any manner available to the mobile device outside of the secure virtual environment, and any errors related to the manipulation of encrypted data may addressed by standard error handling mechanisms outside the secure virtual environment.

If the user is authenticated (i.e., determination block 6022="Yes"), the secure virtual environment may decrypt the data header at block 6026. At determination block 6028 the now decrypted data header may be read, and information about the trusted status of the data may be determined by the secure virtual environment. The data header may contain a trusted id, information about the file format of the data, or any other information. If the decrypted data header shows that the data is not trusted (i.e., determination block 6028="No"), at block 6024 the secure virtual environment closes. At block 6018 the data may be manipulated with a standard application. At block 6018 the encrypted data may be manipulated in any manner available to the mobile device outside of the secure virtual environment, and any errors related to the manipulation of encrypted data may addressed by standard error handling mechanisms outside the secure virtual environment.

If the decrypted data header shows the data to be trusted (i.e., determination block 6028="Yes"), at determination block 6008 the secure virtual environment applies corporate policy and/or user settings and determines if the data type is allowed as discussed above with reference to FIG. 6A. If the data type is not allowed by the corporate policy and/or user settings (i.e., determination block 6008="No"), at block 6024, the secure virtual environment closes, and the data may be manipulated at block 6018 with a standard application. At block 6018 the encrypted data may be manipulated in any manner available to the mobile device outside of the secure virtual environment, and any errors related to the manipulation of encrypted data may addressed by standard error handling mechanisms outside the secure virtual environment.

At block 6008, if the data type may be allowed by corporate policy and/or user settings (i.e., determination block 6008="Yes"), at block 6010 the secure virtual environment may decrypt the data.

At block 6012, an application may be selected to manipulate the trusted and decrypted data. In an optional embodiment, the application selected may be a trusted application specifically authorized to operate in the secure virtual environment. The selection of the application at block 6012, may be independently made by the processor of a mobile device, made by the processor in response to a received user input to the mobile device, or by some combination of the two. Once the user closes the file, at block 6014, the secure virtual environment may encrypt the manipulated data, and at block 6016 the manipulated data may be stored on the mobile device. By encrypting the data at block 6014 no data may be allowed outside the secure virtual environment in an unencrypted form. Again, if no secure data is to be saved to the device, the operations of blocks 6014 and 6016 may not be performed.

A data header may be unencrypted, while the rest of the data packet may be encrypted. In this embodiment the processor may determine whether the packet contains any encrypted data. If any encrypted data is present, then the data may be passed to the secure virtual environment for display and manipulation.

Figure 7A:
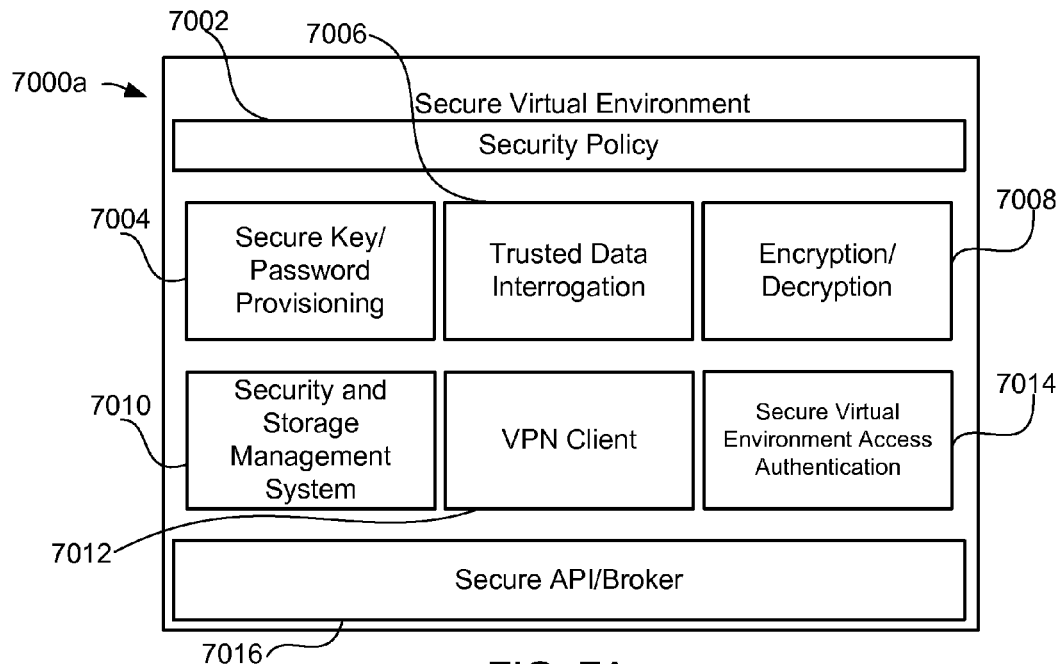
FIGS. 7A and 7B are functional block diagrams of program elements of the secure virtual environment according to two aspects.
Figure 7B:
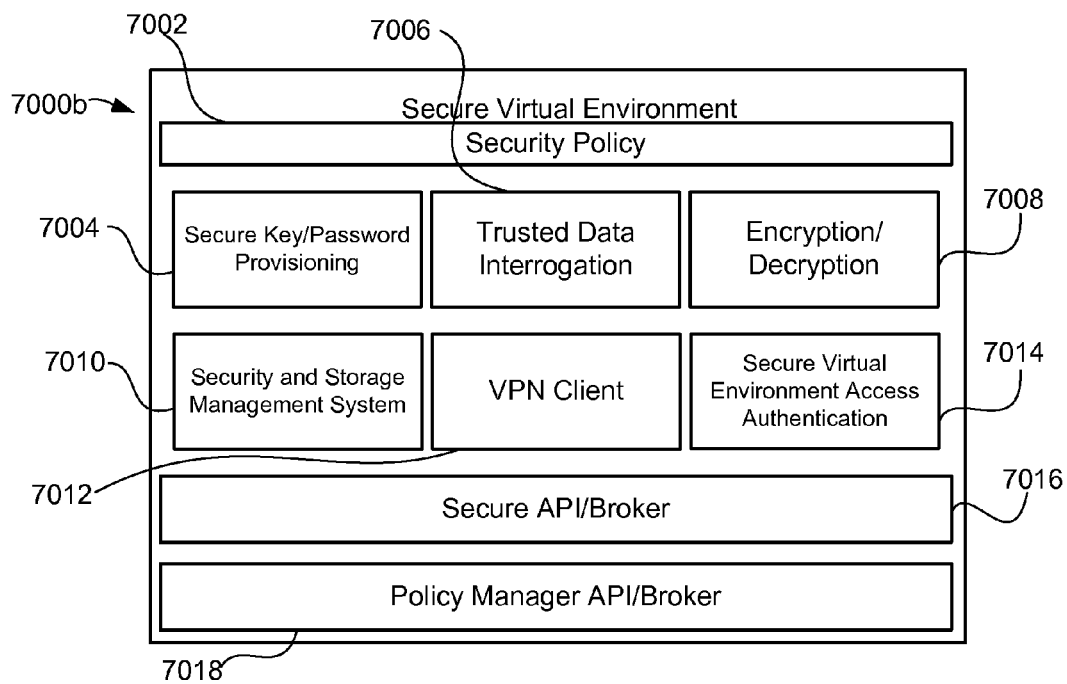

FIGS. 7A and 7B illustrate software architecture elements and processing modules of two embodiments of the secure virtual environment 7000*a* and 7000*b*. FIG. 7A illustrates a secure virtual environment 7000*a* embodiment containing a security policy module 7002, a secure key/password provisioning module 7004, a trusted data interrogation module 7006, an encryption/decryption module 7008, a security and storage management module 7010, a virtual private network (VPN) client module 7012, a secure virtual environment access authentication module 7014, and a secure API/broker module 7016. Each of the modules 7002-7016 may be applications, functional modules within an application, an API, or an interface to another application (e.g., a VPN client).

The security policy module 7002 is a module containing or defining the overarching policy implemented by the secure virtual environment 7000*a* to protect data on a mobile device.

The security policy module 7002 may include a list of allowed file types, data save restrictions, network access restrictions, application restrictions, and any other policy settings which may be necessary to protect secure data on a mobile device.

The secure key/password provisioning module 7004 may allow the secure virtual environment 7000a to provide secure keys and passwords automatically to secure applications and to secure networks. In this manner, once the user has logged onto and been authenticated by the secure virtual environment 7000a, a user may not need to log-in or provide keys or passwords to other secure applications or networks accessed with the secure virtual environment. This is because the secure key/password provisioning module 7004 may automatically provide the needed authentication information.

The trusted data interrogation module 7006 may provide the secure virtual environment 7000a with the ability to interrogate data received to determine if the data is trusted data.

The encryption/decryption module 7008 may decrypt data received by the secure virtual environment 7000a, and may encrypt data transmitted or stored by the secure virtual environment 7000a.

The secure API/broker module 7016 may allow trusted applications to be added to the secure virtual environment 7000a if allowed by the security policy module 7002.

FIG. 7B shows an embodiment with the same elements as described above with reference to FIG. 7A, with the addition of a policy manager API/broker module 7018. The policy manager API/broker module 7018 may allow updates and revisions to the security policy module 7002 to be received by the secure virtual environment 7000b. This embodiment may enable a corporate entity to update or change the security policy on a mobile device remotely without having to have direct physical access to the mobile device.

Figure 9A:
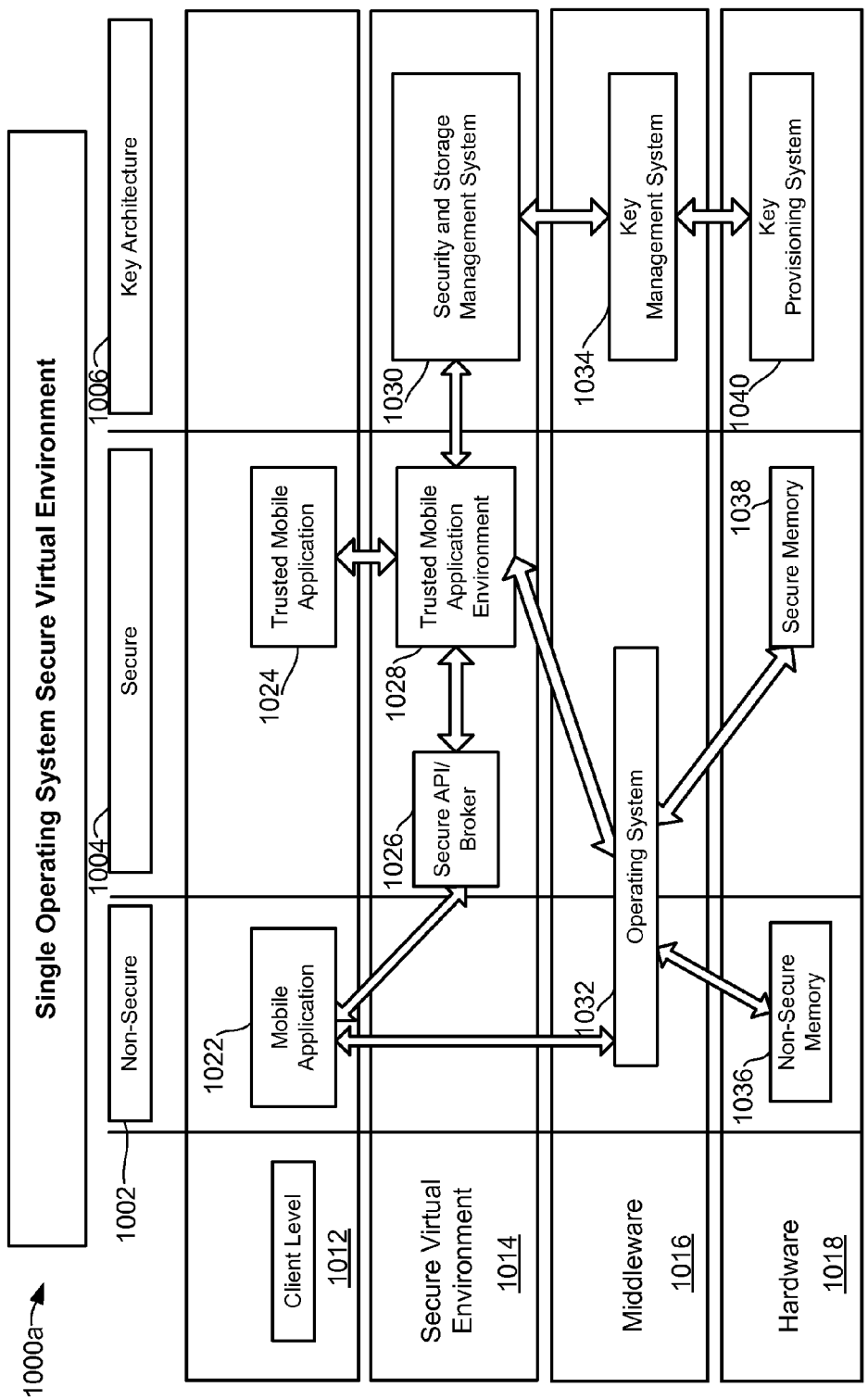
FIGS. 9A-C are system architecture diagrams of security approaches employing various aspects of a secure virtual environment.
Figure 9B:
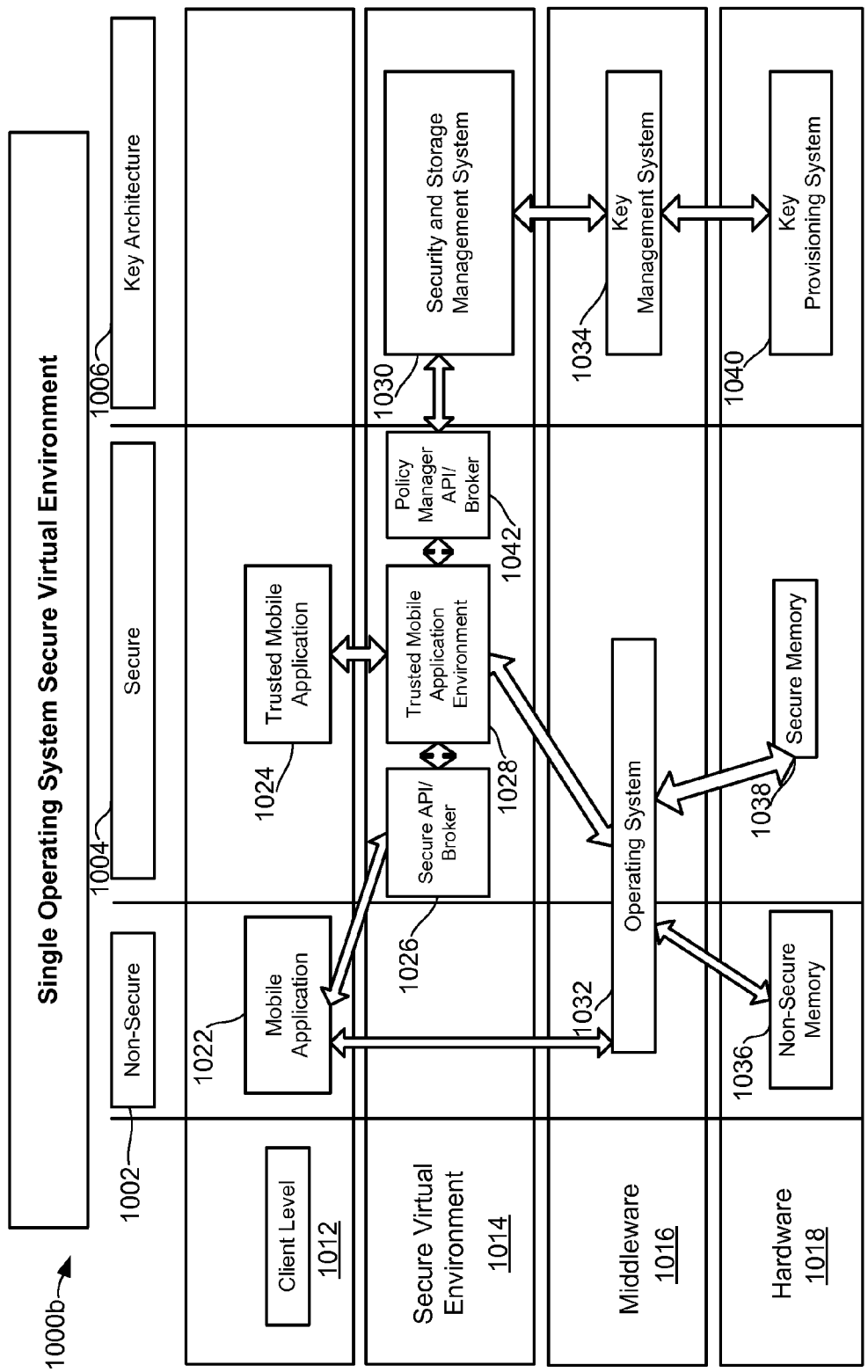
Figure 9C:
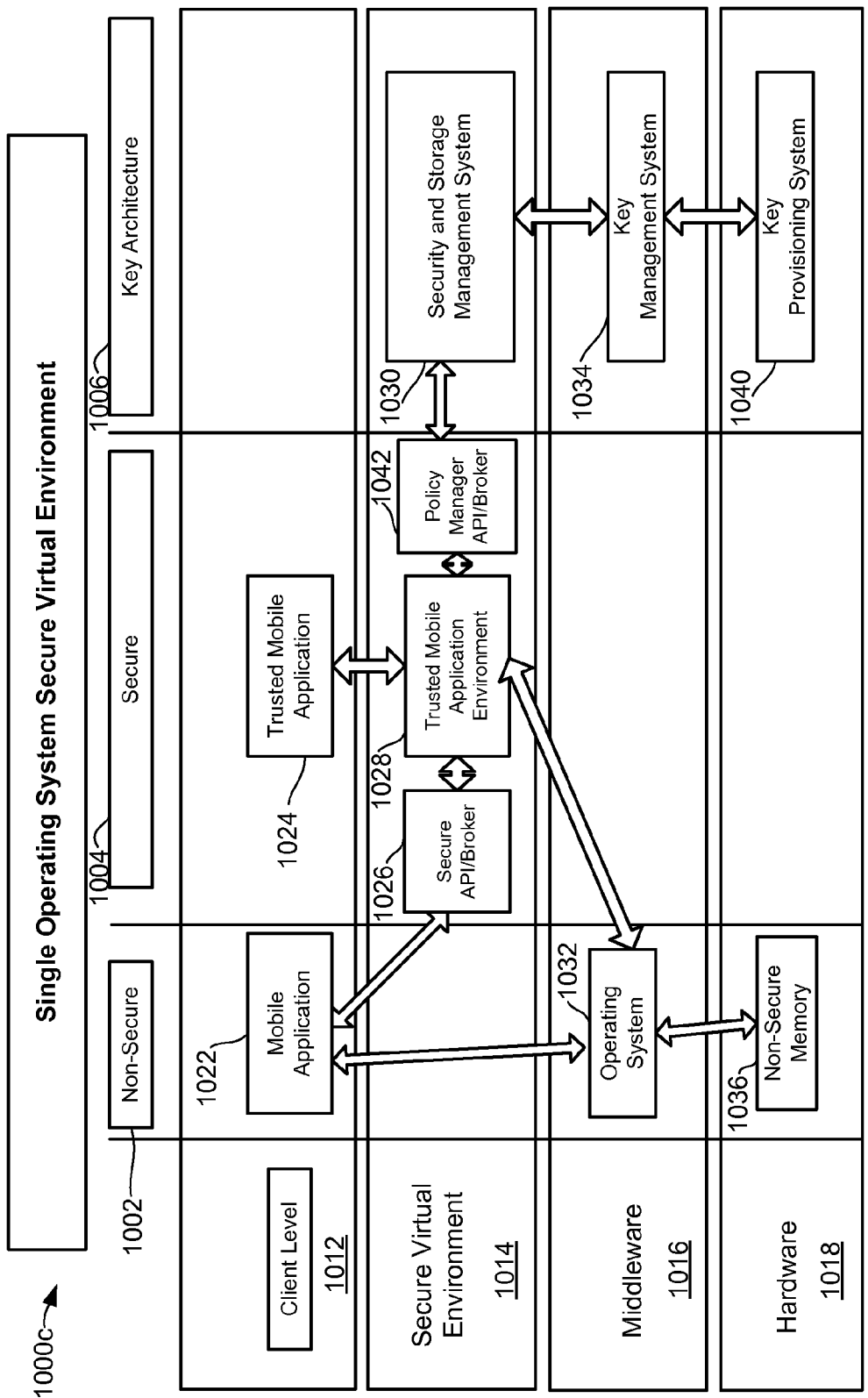

In the various embodiments, secure virtual environment may be provided on a mobile device with multiple operating systems or a single operating system. FIGS. 9A-C illustrate alternative embodiments of a secure virtual environment in which a mobile device is provided with two operating systems, a secure operating system and an unsecure operating system. FIGS. 10A-C illustrate alternative embodiments of a secure virtual environment in which a mobile device is provided with a single operating system.

Figure 8A:
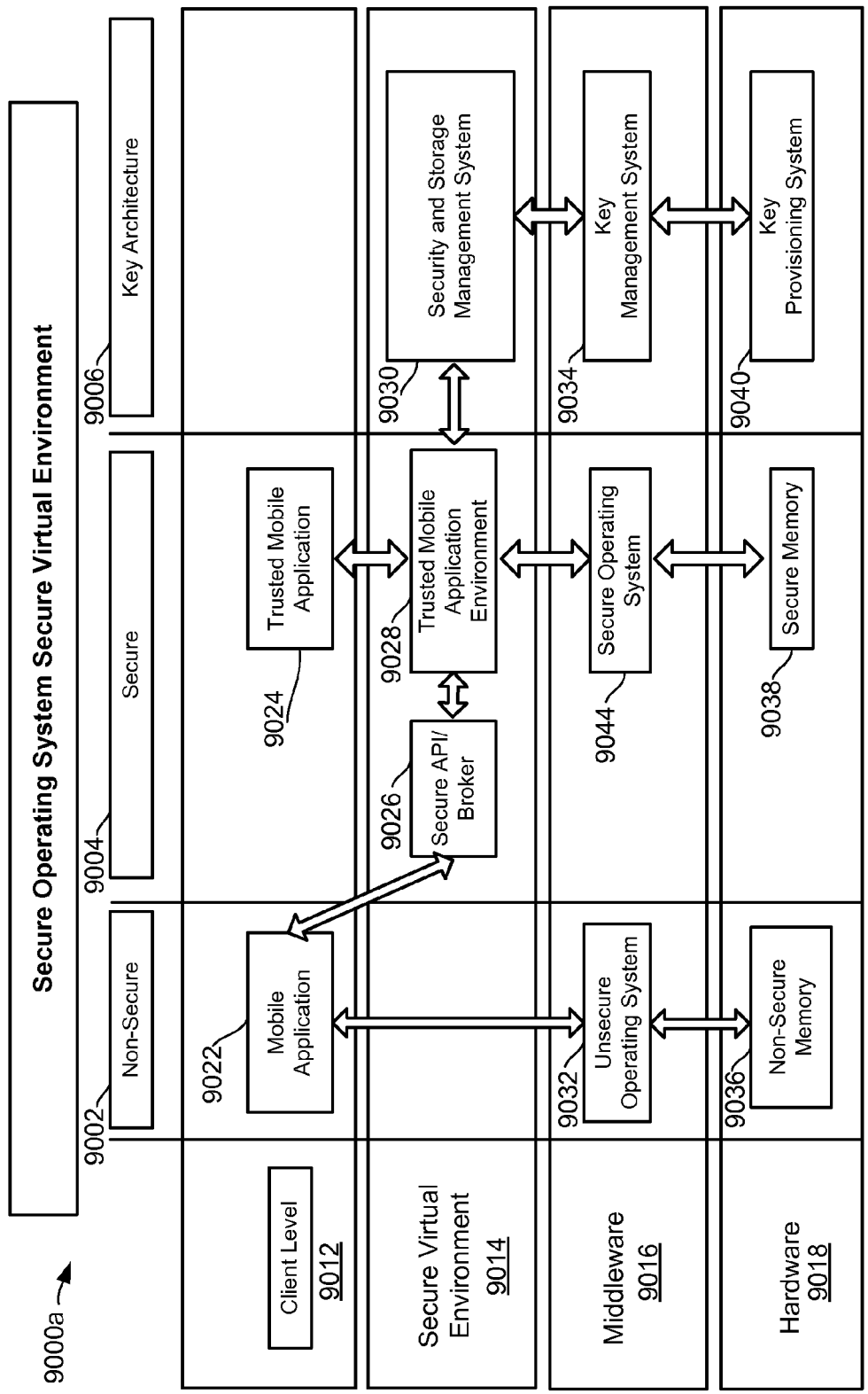
FIGS. 8A-C are system architecture diagrams of security approaches employing various aspects of a secure virtual environment.
Figure 8B:
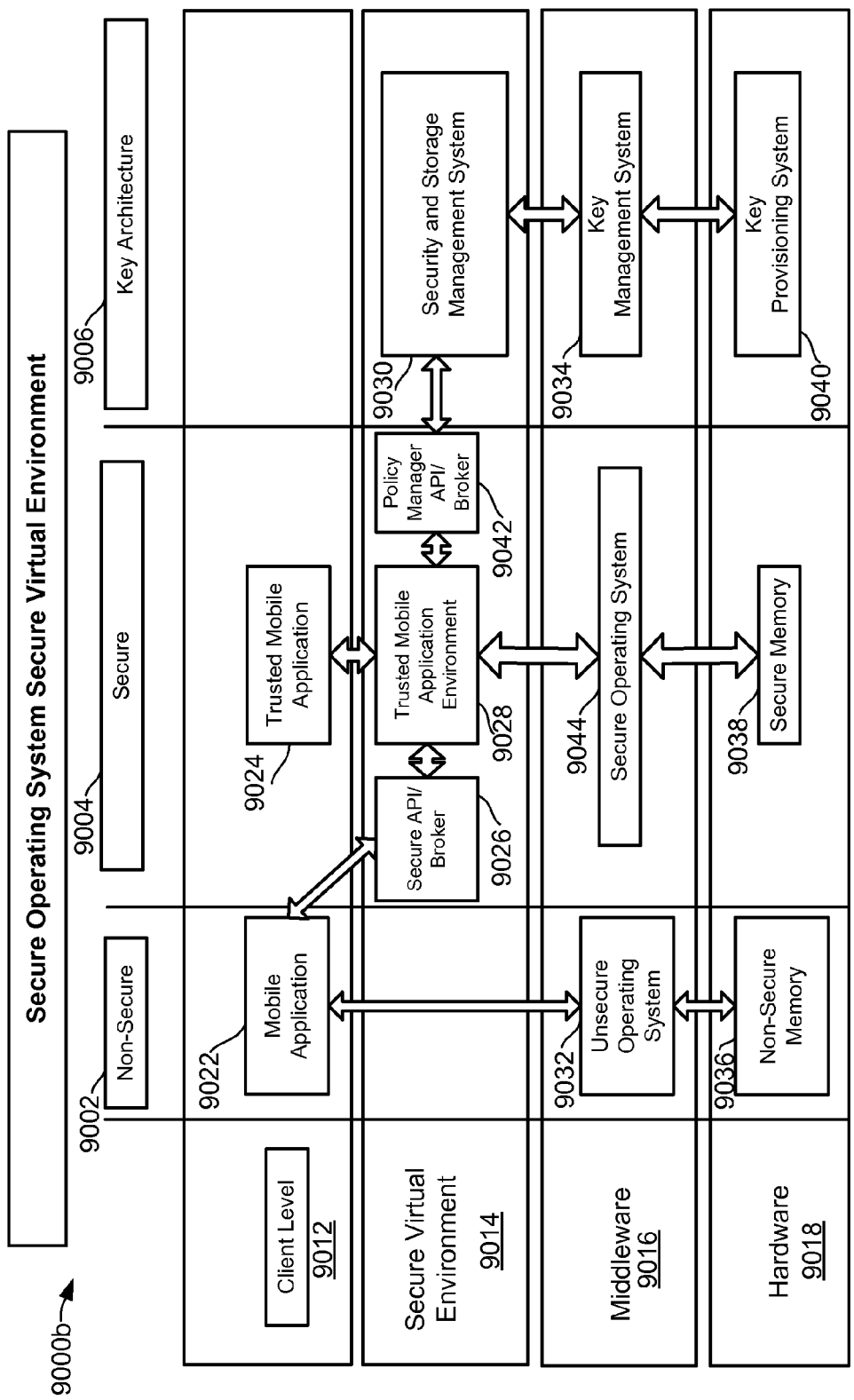
Figure 8C:
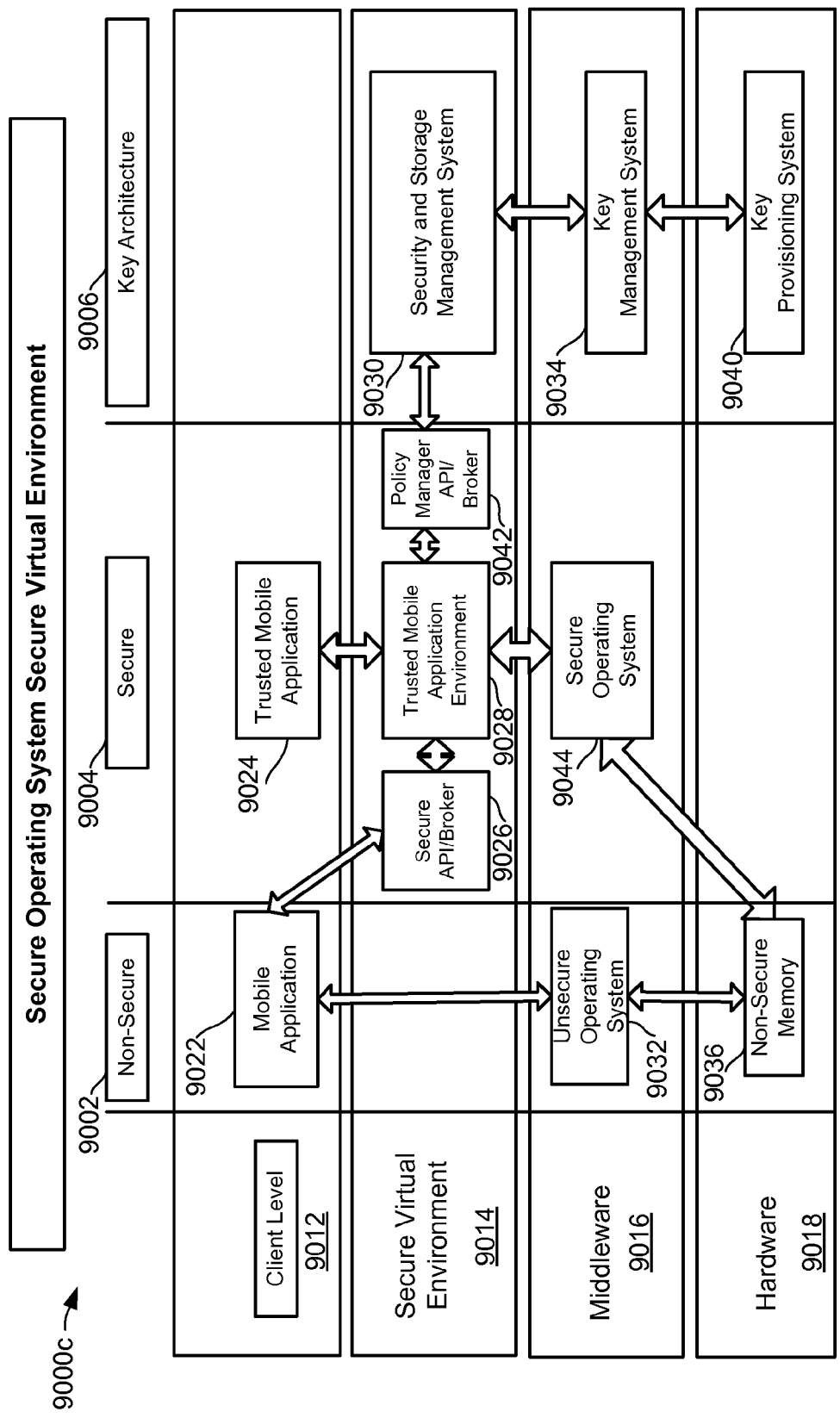

FIGS. 8A-C illustrate alternative embodiments of a secure virtual environment in which a mobile device is provided with a secure operating system and an unsecure operating system. Referring to FIG. 8A, the overall system architecture 9000a includes three areas; a non-secure area 9002, a secure area 9004, and a key architecture 9006. The non-secure area 9002 represents unprotected areas in which security protocols are not applied. The secure area 9004 represents protected areas in which security protocols are applied. The key architecture 9006 represents the areas in which mobile device security keys operate.

The software levels of the system 9000a may be broken down into a client level 9012, a secure virtual environment 9014, a middleware level 9016, and a hardware level 9018.

Client level 9012 software includes mobile, or standard, applications 9022 and trusted mobile applications 9024, also called simply trusted applications. Trusted mobile applications 9024 may be applications specifically provided by the corporate entity that are identified as meeting security requirements and authorized to handle corporate entity data and to operate on the corporate entity's networks and equipment. Trusted mobile applications 9024 may be specific applications designed for the corporate entity or public applications that the corporate entity has previously established as meeting security requirements and operability requirements.

The secure virtual area 9014 may be a software level or run time environment established on a mobile device. The secure virtual area 9014 may be established using a single application or a group of applications. The secure virtual environment 9014 may contain a secure API/broker 9026 which acts as a gate keeper for the secure virtual environment 9014 and controls the operation of data and mobile applications 9022 received from the non-secure area 9002.

The secure API/broker 9026 may allow application designers to create mobile applications 9022 that can operate in the secure virtual environment 9014. In this manner, application designers need not interact with the corporate entity directly to produce applications, and provide applications to mobile devices. An application designer may create a mobile application 9022 which meets the security requirements of the secure virtual environment 9014 independent of the corporate entity.

A mobile device user may attempt to download or access the mobile application 9022 stored in a non-secure area. In response the secure API/broker 9026 may determine if the mobile application 9022 meets the security and operability requirements for the specific secure virtual environment 9014 established on the mobile device. Should the mobile application 9022 meet the security and operability requirements the mobile application 9022 may be allowed to operate in the secure virtual environment 9014 and be provided to the trusted mobile application environment 9028. The trusted mobile application environment 9028 may be an area of the secure virtual environment 9014, including a GUI, in which the authorized applications operate. Should the mobile application 9022 not meet the requirements of the secure API/broker 9026, the mobile application 9022 may not be allowed to interact further with the secure virtual environment 9014.

Additionally the secure virtual environment may include a security and storage management system 9030 which interacts with the trusted mobile application environment 9028 and the key management system 9034 to provide necessary security and storage capability.

An unsecure operating system 9032 may be provided on the mobile device in a non-secure area 9002 and a non-secure memory 9036 may be provided in a non-secure area 9002. A mobile application 9022 which does not meet the requirements of the secure API/broker 9026 may only operate in the unsecure operating system 9032 and may only write or read data to the non-secure memory 9036.

Provided in the secure area 9004 of the mobile device may be a secure operating system 9044 and a secure memory 9038. Trusted mobile applications 9024 may be provided to the trusted mobile application environment 9028. Trusted mobile applications 9024, or mobile applications 9022 which meet the requirements of the secure API/broker 9026, may be provided to the secure operating system 9044 through the trusted mobile application environment 9028. Only applications in the trusted mobile application environment 9028 interact with the secure operating system 9044 and the secure memory 9038. In the embodiment illustrated in FIG. 8A the non-secure memory 9036, the secure memory 9038 and the key provisioning system 9040 reside at the hardware level 9018.

FIG. 8B illustrates another embodiment system architecture 9000b that is similar to those described above with reference to FIG. 8A, with the addition of a policy manager API/broker 9042 in the secure virtual environment. The policy manager API/broker 9042 may be in communication with the security and storage management system 9030 and the trusted mobile application environment 9028. Through either the trusted mobile application environment 9028, or the security and storage management system 9030, the policy manager API/broker 9042 may receive corporate policy updates from the corporate entity.

The policy manager API/broker 9042 may enable the corporate entity to update security protocols, update operating restrictions, and perform various functions in the secure virtual environment 9014 and the secure area 9004 of the mobile device. The policy manager API/broker 9042 gives the corporate entity the ability to remotely update and control the secure virtual environment 9014 and secure area 9004 of the mobile device.

FIG. 8C illustrates another embodiment architecture 9000c that includes modules similar to those described above with respect to FIG. 8B, including the policy manger API/broker 9042, but with a single memory 9036 on the mobile device. In this embodiment, the secure operating system 9044 and the unsecure operating system 9032 both store and read data on the non-secure memory 9036. Data in the secure virtual environment 9014 may be stored in an encrypted form when not in use by the trusted mobile application environment 9028. The continual application of encryption at the data level by the secure virtual environment 9014 ensures that secure data may be stored in a non-secure memory 9036 because the secure data itself will be encrypted at the data level.

FIGS. 9A-C illustrate alternative embodiments of a secure virtual environment in which a mobile device is configured with a single operating system. Referring to FIG. 9A, the overall system architecture 1000a may include three areas; a non-secure area 1002, a secure area 1004, and a key architecture 1006. The non-secure area 1002 represents unprotected areas in which security protocols are not applied. The secure area 1004 represents protected areas in which security protocols are applied. The key architecture 1006 represents the areas in which mobile device security keys operate.

The software levels of the system 1000a may be broken down into a client level 1012, a secure virtual environment 1014, a middleware level 1016, and a hardware level 1018.

Similar to the embodiments discussed above, the client level 1012 software includes mobile, or standard, applications 1022 and trusted mobile applications 1024, also called simply trusted applications. Trusted mobile applications 1024 may be applications specifically provided by the corporate entity that may be identified as meeting security requirements and authorized to handle corporate entity data and to operate on the corporate entity's networks and equipment. Trusted mobile applications 1024 may be specific applications designed for the corporate entity or public applications that the corporate entity has previously established as meeting security requirements and operability requirements.

Similar to the embodiments discussed above, the secure virtual area 1014 may be a software level or run time environment established on a mobile device. The secure virtual area 1014 may be established using a single application or a group of applications. The secure virtual environment 1014 may contain a secure API/broker 1026 which acts as a gate keeper for the secure virtual environment 1014 and controls the operation of data and mobile applications 1022 received from the non-secure area 1002.

Similar to the embodiments discussed above, the secure API/broker 1026 may allow application designers to create mobile applications 1022 that can operate in the secure virtual environment 1014. In this manner, application designers need not interact with the corporate entity directly to produce applications, and provide applications to mobile devices. An application designer may create a mobile application 1022 which meets the security requirements of the secure virtual environment 1014 independent of the corporate entity.

Similar to the embodiments discussed above, a mobile device user may attempt to download or access the mobile application 1022 stored in a non-secure area. In response, the secure API/broker 1026 may determine if the mobile application 1022 meets the security and operability requirements for the specific secure virtual environment 1014 established on the mobile device. Should the mobile application 1022 meet the security and operability requirements the mobile application 1022 may be allowed to operate in the secure virtual environment 1014 and be provided to the trusted mobile application environment 1028. The trusted mobile application environment 1028 may be an area of the secure virtual environment 1014, including a GUI, in which the authorized applications operate. Should the mobile application 1022 not meet the requirements of the secure API/broker 1026, the mobile application 1022 may not be allowed to interact further with the secure virtual environment 1014.

Additionally the secure virtual environment may include a security and storage management system 1030 which interacts with the trusted mobile application environment 1028 and the key management system 1034 to provide necessary security and storage capability.

An operating system 1032 may be provided on the mobile device in both a non-secure area 1002 and a secure area 1004. The single operating system 1032 interacts with the secure virtual environment 1032 through the trusted mobile application environment 1028 and mobile applications 1022 in a non-secure area 1002. The operating system 1032 may be configured such that a mobile application 1022 which does not meet the requirements of the secure API/broker 1026 may only function in a non-secure area 1002 of the operating system 1032 and may only write or read data to the non-secure memory 1036. The operating system 1032 may also operate in the secure area 1004 of the mobile device and read and write data to a secure memory 1038.

Trusted mobile applications 1024 may be provided to the trusted mobile application environment 1028. Either trusted mobile applications 1024, or mobile applications 1022 which meet the requirements of the secure API/broker 1026, may be provided to the operating system 1044 through the trusted mobile application environment 1028. Only applications in the trusted mobile application environment 1028 interact with the secure memory 1038 through the operating system 1032. In the embodiment illustrated in FIG. 9A the non-secure memory 1036, the secure memory 1038 and the key provisioning system 1040 reside at the hardware level 1018.

FIG. 9B illustrates another embodiment system architecture 1000b that includes modules similar to those described above with reference to FIG. 9A, with the addition of a policy manager API/broker 1042 in the secure virtual environment. The policy manager API/broker 1042 may be in communication with the security and storage management system 1030 and the trusted mobile application environment 1028. Through either the trusted mobile application environment 1028, or the security and storage management system 1030, the policy manager API/broker 1042 may receive corporate policy updates from the corporate entity.

The policy manager API/broker 1042 may enable the corporate entity to update security protocols, update operating restrictions, and perform various functions in the secure virtual environment 1014 and the secure area 1004 of the mobile device. The policy manager API/broker 1042 gives the corporate entity the ability to remotely update and control the secure virtual environment 1014 and secure area 1004 of the mobile device.

FIG. 9C illustrates another embodiment of the system architecture 1000c that includes modules similar to those described above with respect to FIG. 9B, but with a single memory 1036 on the mobile device. Additionally, in this aspect the operating system 1032 resides entirely in the non-secure area 1002. In this embodiment data from the trusted mobile application environment 1028 and all other data passes to a single non-secure memory 1036. All data in the secure virtual environment 1014 may be stored in an encrypted form when not in use by the trusted mobile application environment 1028. The continual application of encryption at the data level by the secure virtual environment 1014 ensures that secure data may be stored in a non-secure memory 1036 because the secure data itself will be encrypted at the data level.

FIGS. 10A and 10B illustrate example displays of a mobile device 1100 embodying aspects of the secure virtual environment. FIG. 10A illustrates a mobile device 1100 display operating in a non-secure mode. The mobile device 1100 display includes a status bar 1102 and a touch screen 1104. The touch screen 1104 shows a desktop configured to display icons 1106-1128 representing available mobile applications 1106, 1108, 1110, 1112, 1114, 1116, 1118, 1120, 1122, 1124, 1126, and 1128 available in the non-secure mode. At the bottom of the touch screen 1104 is shown an icon for the secure virtual environment 1130. Selection of the secure virtual environment icon 1130 by a user may be configured to start the secure virtual environment. In the secure virtual environment only trusted mobile applications may be provisioned to the user.

FIG. 10B illustrates an embodiment display of the mobile device 1100 while operating in a secure virtual environment mode. The touch screen 1104 includes a banner 1132 indicating the mobile device is operating in the secure virtual environment. The touch screen 1104 also only displays icons for trusted mobile applications 1134, 1128, 1136, 1138, 1124, and 1120 which may be authorized to operate in the secure virtual environment. An EXIT secure virtual environment icon 1140 appears at the bottom of the touch screen 1104 and may be linked to functionality allowing the user to exit the secure virtual environment. As may be seen between the comparison of the icons present in the display 1104 in FIG. 10A and in FIG. 10B in some applications on the mobile device may be capable of operating both in the non-secure and secure environments. For example, the e-mail application 1124 and calendar application 1120 are illustrated as being present in both the non-secure (FIG. 10A) and secure environments (FIG. 10B).

FIGS. 11A and 11B illustrate an example of a mobile device 1200 embodying aspects of the secure virtual environment. FIG. 11A illustrates a mobile device 1200 operating in a non-secure mode. The mobile device 1200 display includes a status bar 1202 and a touch screen 1204. The touch screen 1204 shows a desktop configured to display icons 1206-1228 representing available mobile applications 1206, 1208, 1210, 1212, 1214, 1216, 1218, 1220, 1222, 1224, 1226, and 1228 available in the non-secure mode. At the bottom of the touch screen 1204 is shown an icon for activating the secure virtual environment 1230. Selection of the secure virtual environment icon 1230 by a user starts the secure virtual environment.

FIG. 11B illustrates an embodiment display of the mobile device 1200 operating in a secure virtual environment mode. The touch screen 1204 includes a banner 1232 indicating the mobile device is operating in the secure virtual environment. The display 1204 also only displays icons for trusted mobile applications 1234, 1236, and 1238. An EXIT secure virtual environment icon 1240 appears at the bottom of the display 1204 and may be linked to functionality to enable the user to exit the secure virtual environment. Illustrated in the touch screen 1204 in FIG. 11A and in FIG. 11B, in one aspect applications on the mobile device available in the secure virtual environment may be distinct from the applications available in the non-secure mode. A client e-mail application 1236 may be a unique application separate from the e-mail application 1224 shown in FIG. 11A. In this aspect both a secure operating environment and specifically designed secure client applications may be presented to the mobile device 1204 in FIG. 11B.

Figure 12:
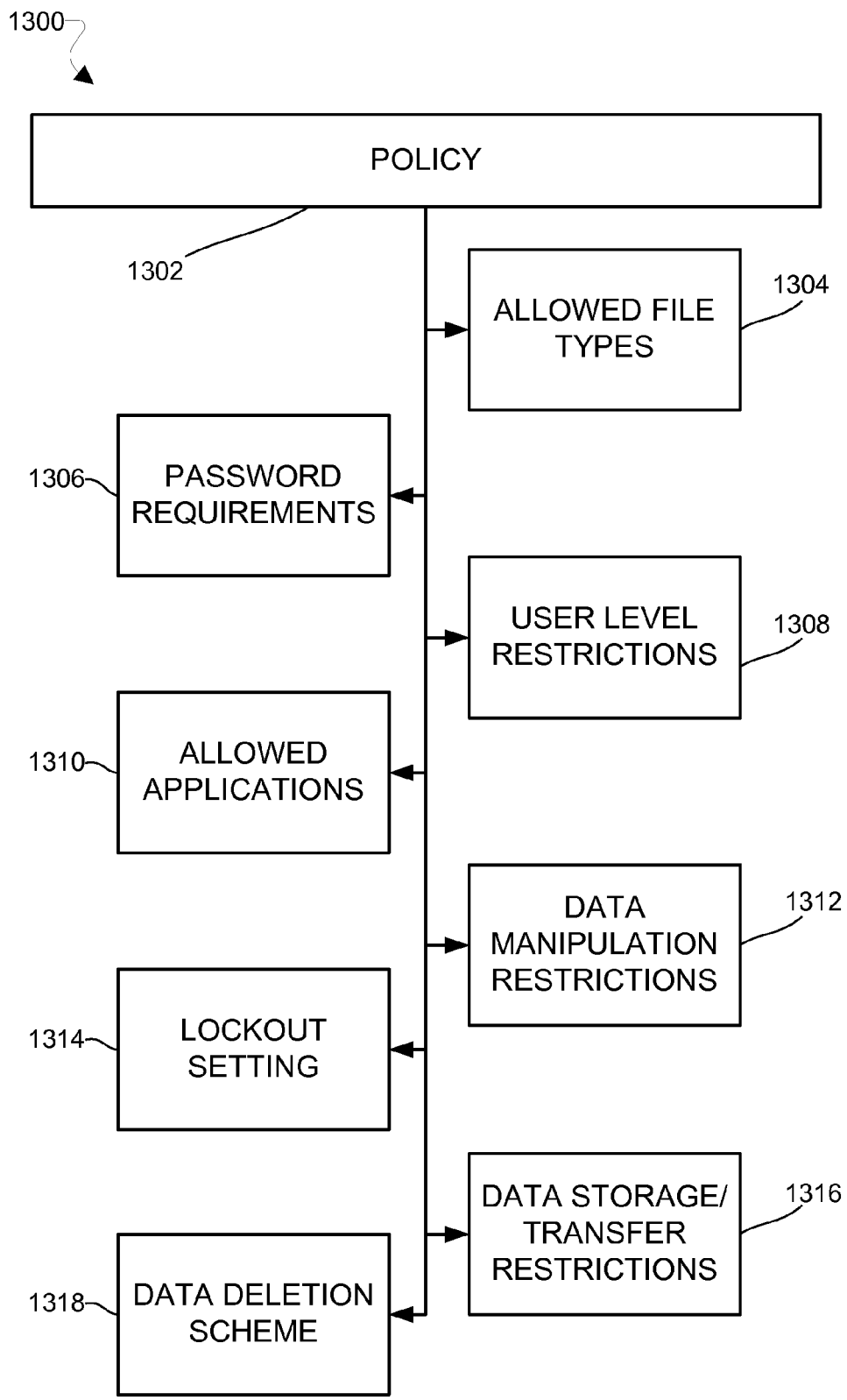
FIG. 12 is a schematic diagram of potential elements of corporate policy which may be provisioned to a secure virtual environment on a mobile device.

FIG. 12 is a schematic diagram of potential elements of a corporate security policy 1300 which may be provisioned to a secure virtual environment on a mobile device. The corporate security policy 1302 may include designations of allowed file types 1304, password requirements 1306, user level restrictions 1308, designations of specific allowed applications 1310, data manipulation restrictions 1312, lockout settings 1314, data storage/transfer restrictions 1316, and data deletion schemes 1318.

The corporate security policy 1302 may allow the corporate entity to set and control the security requirements of secure areas on the mobile device.

Policies associated with allowed file types 1304 may be any security or operation controls set on the mobile device related to file type. These may include designating a file type (such as a .jpg) as allowed to operate in the secure virtual environment, while preventing other file types (such as .exe) from being imported into the secure virtual environment.

Policies associated with password requirements 1306 may be any security or operation controls set on the mobile device related to passwords. These may include setting password length or character requirements, password update requirements, or the like.

Policies concerning user level restrictions 1312 may be directed to any policy concerning different levels of access for different levels of users to applications, networks, mobile devices, or any other access level related area or device. User level restrictions 1312 may include restricting access to a network to only mobile devices of users designated with the highest user level.

Policies related to allowed applications 1310 may include policies directed to any aspect of applications operating on or with the mobile device and/or the secure virtual environment. Policies related to allowed applications may include policies preventing the downloading of certain applications or application types, including the prevention of the download or use of trusted applications.

Policies related to data manipulation restrictions 1312 may include security or operation policy controlling any aspect of data manipulation. The policies related to data manipulation 1312 may include policy preventing the opening of data types or applications within certain applications, or other data manipulation restrictions.

Policies related to lockout settings 1314 may regulate lockout settings 1314 such as how long after the mobile device is detected as being idle that secure virtual environment may be closed, or how many incorrect log in attempts to the secure virtual environment may be allowed before the secure virtual environment may be permanently locked to access. Also, as discussed above, policies may also indentify conditions or events which should trigger automatic termination of the secure virtual environment and encryption or deletion of all secure data.

Policies related to data storage/transfer restrictions 1316 may include any policy related to handling or transfer of data, including preventing files from being saved in the secure virtual environment or restricting transfers of data between mobile devices.

Policies related to a data deletion scheme 1318 may include policies defining when data should be automatically deleted from the mobile device, or settings for the secure virtual environment that causes the secure virtual environment to delete all data of a certain age stored in a secure memory after a set period of time.

Figure 13:
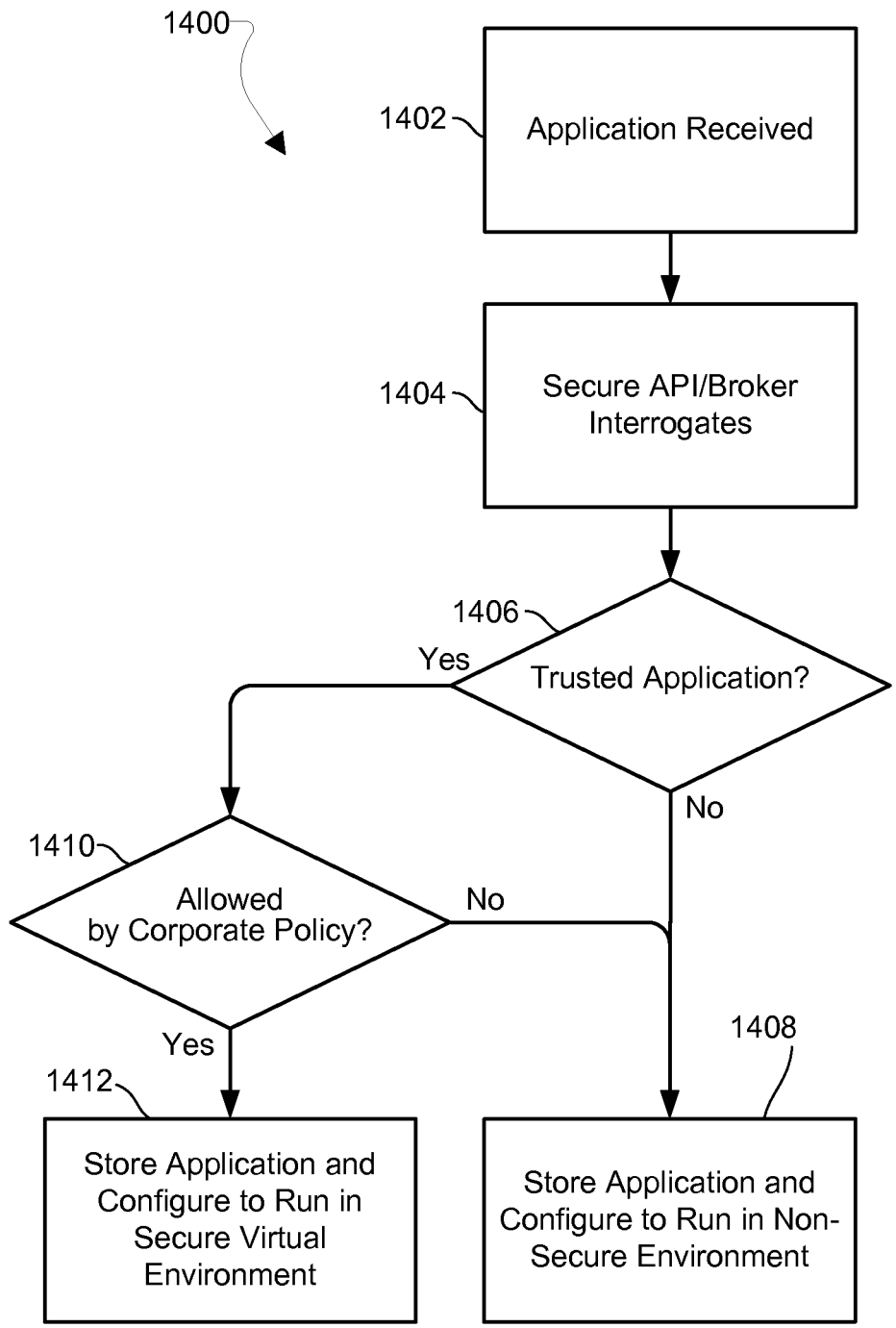
FIG. 13 is a process flow diagram of an aspect method for sorting received mobile applications on a mobile device employing a secure virtual environment.

FIG. 13 illustrates an embodiment method 1400 for sorting received mobile applications on a mobile device employing a secure virtual environment. The method 1400 may be implemented within a processor of a mobile device by configuring the processor with suitable processor-executable instructions to perform the operations of the method. In block 1402 an application may be received at the mobile device. The application may be received from a secure or non-secure network connection. In block 1404, the secure API/broker may interrogate the received application. In determination block 1406, the secure API/broker may determine if the application is a trusted application. If the application is not trusted (i.e., determination block 1406="No"), in block 1408 the application may be stored and configured to run in the non-secure environment. If the application is determined to be trusted (i.e., determination block 1406="Yes"), the secure API/broker may determine in determination block 1410 whether the application may be allowed by the corporate policy implemented on the mobile device. If the application is not allowed by corporate policy (i.e., determination block 1410="No"), the application may be stored and configured to run in the non-secure environment in block 1408. If the application is allowed by the corporate policy (i.e., determination block 1410="Yes"), the application may be stored and configured to run in the secure virtual environment in block 1412. In some embodiments, an application allowed by the corporate policy may be configured to run in both the secure and non-secure environment (i.e., performing the operations of both blocks 1408 and 1412).

Figure 14:
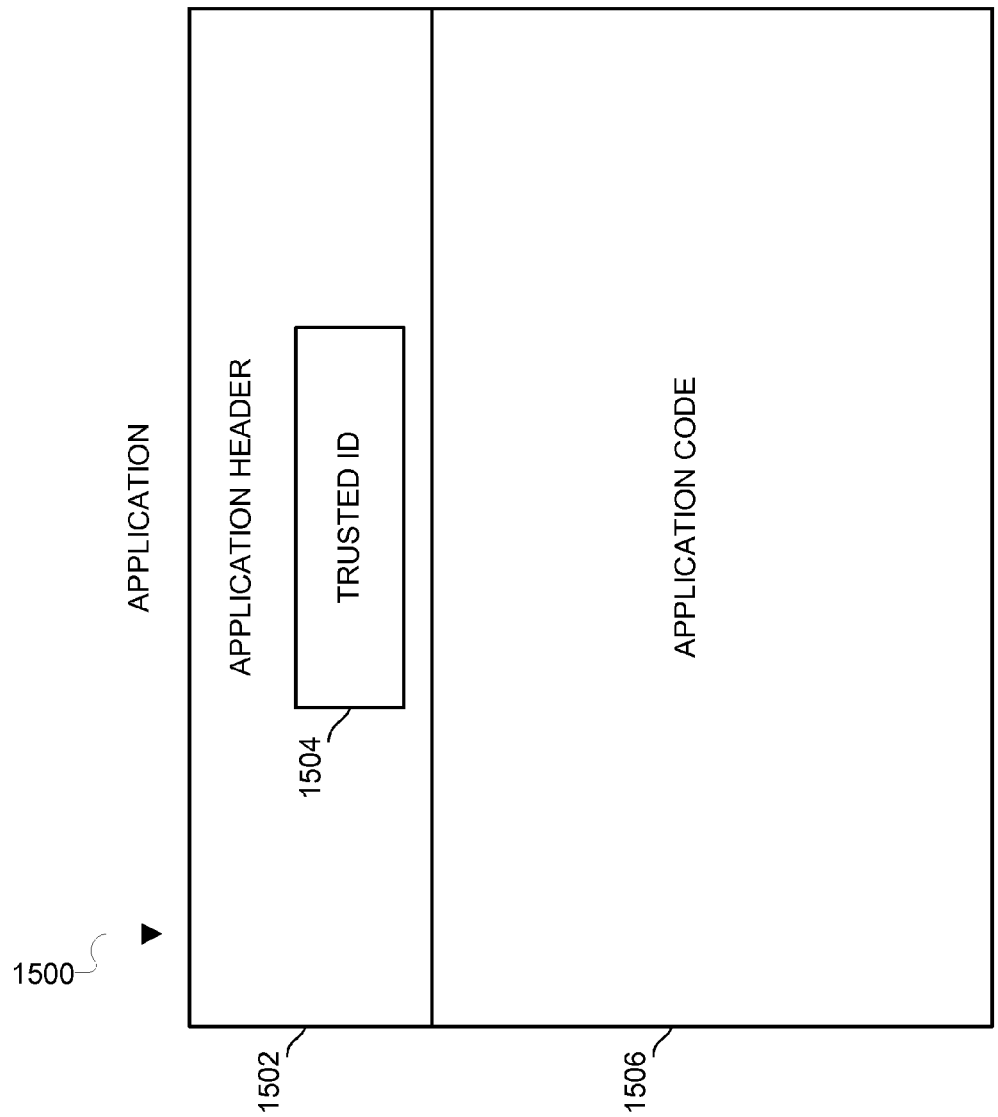
FIG. 14 is a schematic diagram of a potential application received at a mobile device.

FIG. 14 is a schematic diagram of a potential application 1500 received at a mobile device. The application 1500 may include an application header 1502 which includes a trusted ID 1504. The trusted ID 1504 may serve as the credentials for identifying that the application 1500 is capable, and potentially allowed, to operate in the secure virtual environment. The application code 1506 may be separated from the application header 1502. In this manner an application header 1502 may be read without requiring the actual application code 1506 to be manipulated. A mobile device employing a secure API/broker may read the header of the application, and the secure API/broker may determine if the application 1500 is trusted by analyzing the trusted ID 1504. Additionally, the trusted ID 1504 or other information from the application header 1502 may be used by a secure API/broker to determine if an application may be allowed by the current corporate policy.

Figure 15:
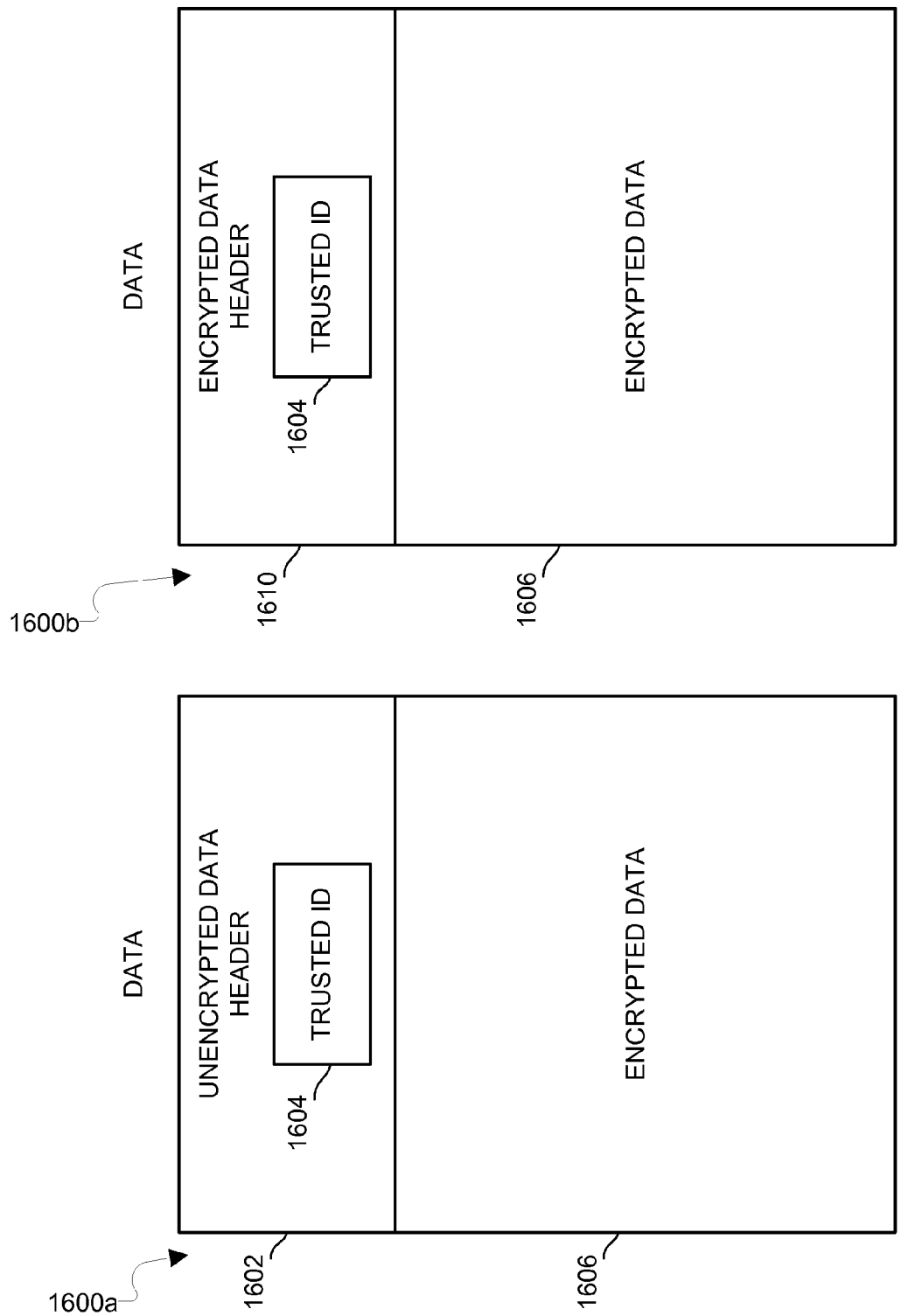
FIGS. 15A and 15B are schematic diagrams of potential data received at a mobile device.

FIGS. 15A and 15B illustrate two embodiment data structures 1600a and 1600b. FIG. 15A shows data 1600a which is composed of an unencrypted data header 1602 which includes a trusted ID 1604. In this aspect, the data structure 1600a may be identified as trusted by the trusted ID 1604 without any decryption being necessary, because the unencrypted data header 1602 may be read by any application, with or without encryption/decryption capability. The trusted ID 1604 serves as the credentials for identifying that the data 1600a is capable of and potentially allowed to operate in the secure virtual environment.

FIG. 15B illustrates an embodiment data structure 1600b similar to that described above with reference to FIG. 15A, except that data structure 1600b has an encrypted data header 1610. The encrypted data header 1610 includes a trusted ID 1604 that serves as a credential for identifying that the data 1600b is capable of and potentially allowed to operate in the secure virtual environment. In this aspect the encrypted data header 1610 provides an extra layer of security, ensuring the entirety of the data 1600b may be encrypted and protected at the data level.

Figure 16:
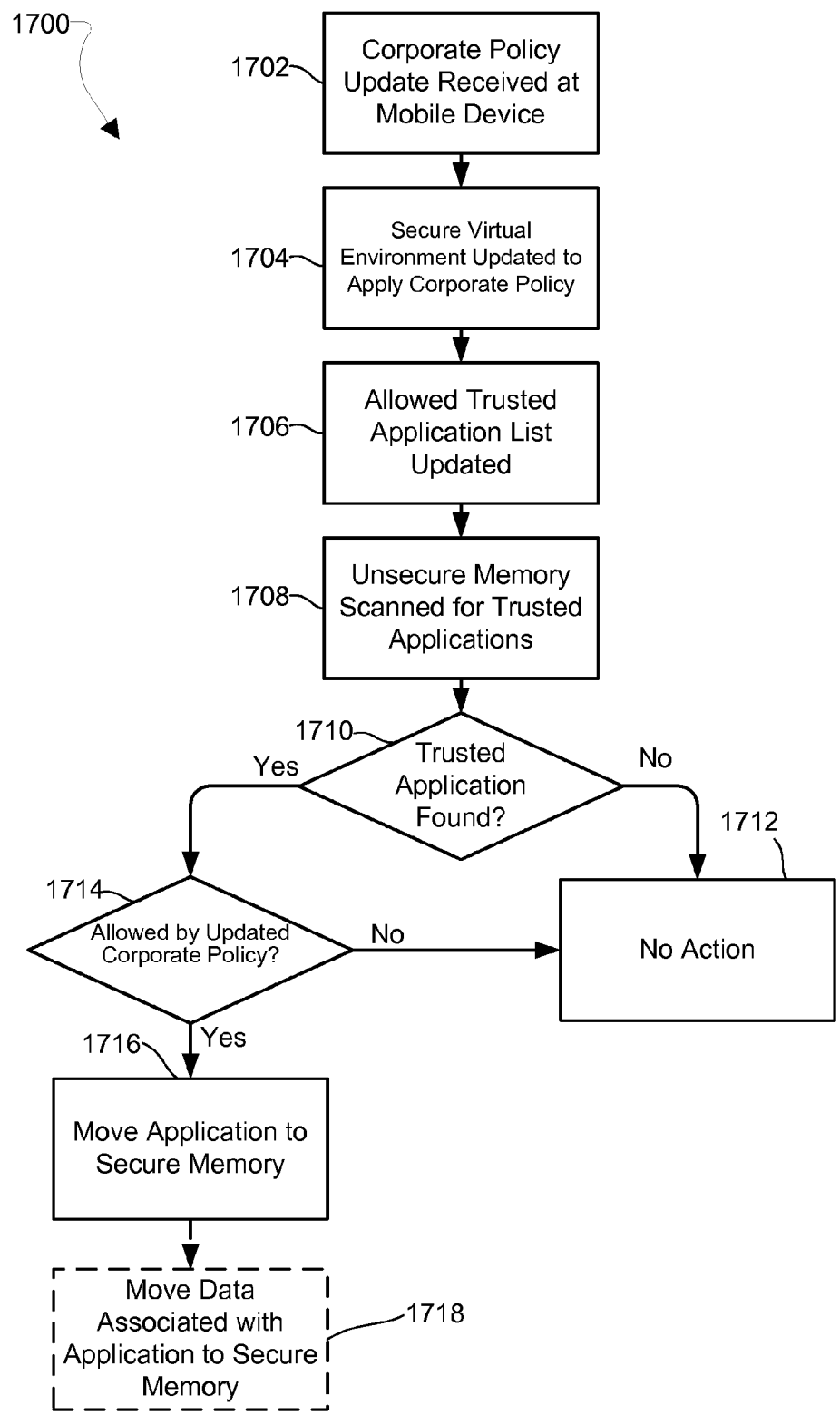
FIG. 16 is a process flow diagram of an aspect method for provisioning corporate policy to a mobile device.

FIG. 16 illustrates an embodiment method 1700 for provisioning corporate policies in a mobile device. This method 1700 may be implemented within a processor of a mobile device by configuring the processor with suitable processor-executable instructions to perform the operations of the method. In block 1702, a corporate policy update may be received at the mobile device. The corporate policy update may update various aspects of the security policies applied on the mobile device including; allowed file types; password requirements; user level restrictions; allowed applications; data manipulation restrictions; lockout settings; data storage/transfer restrictions; and data deletion schemes. The corporate policy update may be received over a secure or non-secure network.

At block 1704, the secure virtual environment may be updated to apply the corporate policies received a block 1702. In block 1706, the allowed trusted application list may be updated. The allowed trusted application list may be a list or table of trusted applications that may be allowed by the corporate policy to operate in the secure virtual environment established on the mobile device.

In block 1708, the mobile device unsecured memory may be scanned for trusted applications. This scan may be executed by the secure virtual environment or by other aspects of the mobile device. In determination block 1710, the processor implementing the secure virtual environment may determine whether any trusted applications were found in the unsecure memory. If no trusted applications are found residing on the unsecured memory (i.e., determination block 1710="No"), no action may be taken at block 1712.

If trusted applications are found in the unsecured memory (i.e., determination block 1710="Yes"), at determination block 1714 the processor implementing the secure virtual environment may determine whether any found trusted applications are allowed by the updated corporate policy. The processor implementing the secure virtual environment may compare a trusted ID or other attributes of any trusted application found on the unsecure memory to the allowed trusted application list. If the trusted applications are not allowed by corporate policy (i.e., determination block 1714="No"), at block 1712 no action may be taken.

If any trusted applications are allowed by corporate policy (i.e., determination block 1714="Yes"), at block 1716 the applications may be moved from the unsecured memory to a secure memory of the mobile device. In a further embodiment, data associated with any trusted applications moved to a secure memory of the mobile device may be also moved to the secure memory at block 1718.

Figure 17:
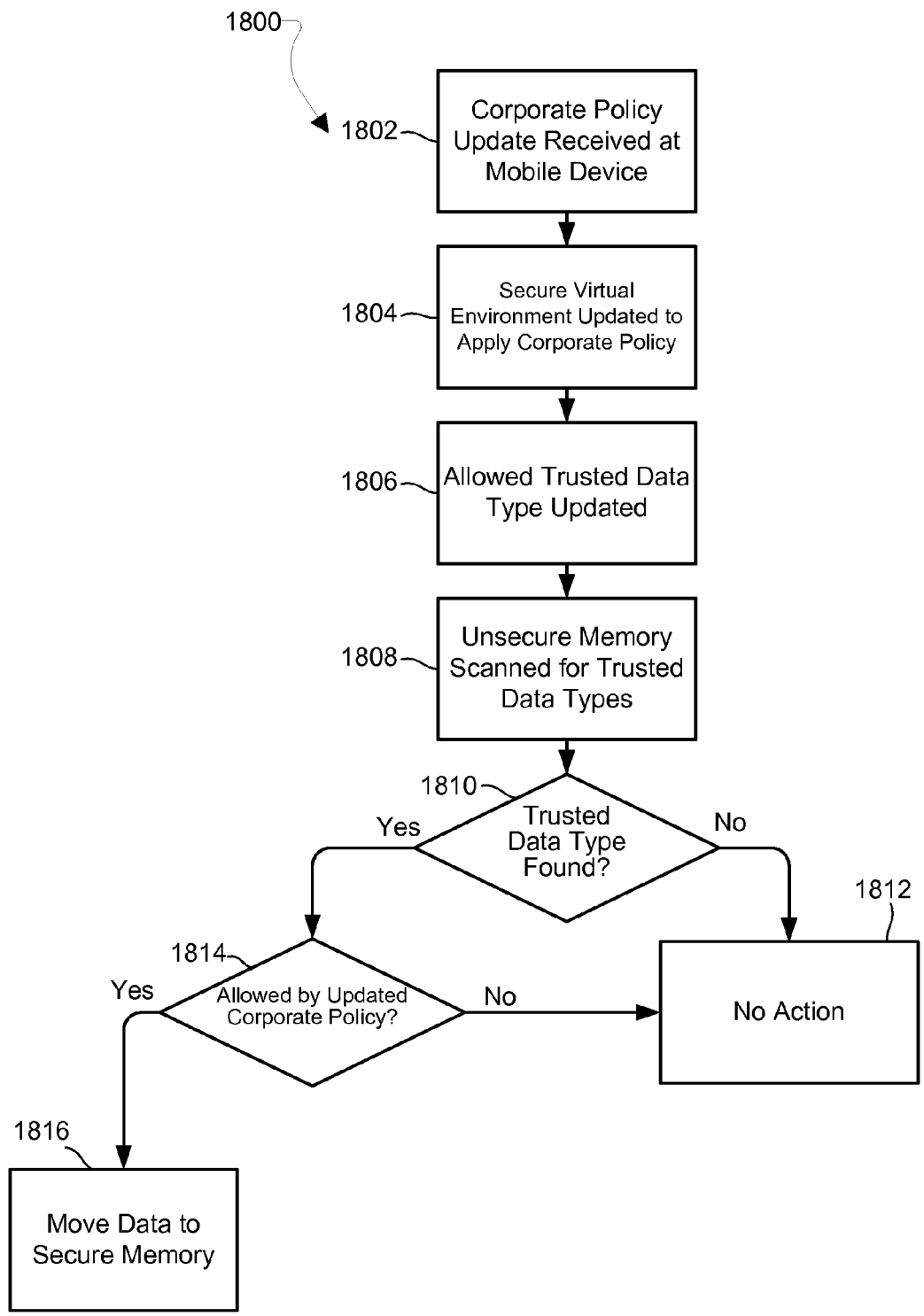
FIG. 17 is a process flow diagram of an aspect method for updating trusted data types on a mobile device.

FIG. 17 illustrates an embodiment method 1800 for updating trusted data types on a mobile device. This method 1800 may be implemented within a processor of a mobile device by configuring the processor with suitable processor-executable instructions to perform the operations of the method. At block 1802, a corporate policy update may be received at the mobile device. In this aspect the corporate policy update includes an update of the allowed trusted data types. The corporate policy update may be received over a secure or non-secure network.

In block 1804, the secure virtual environment may be updated to apply the updated corporate policies. In block 1806, an allowed trusted data type may be updated with the updated corporate policies. This may include updating a list or table of allowed trusted data types that may function within the secure virtual environment.

At block 1808 the unsecured memory may be scanned for trusted data types. This may be executed by the secure virtual environment or by other aspects of the mobile device. In determination block 1810, the processor implementing the secure virtual environment may determine whether trusted data types were found in the unsecured memory. If no trusted data types are found (i.e., determination block 1810="No"), in block 1812 no action may be taken.

If trusted data types are found (i.e., determination block 1810="Yes"), at determination block 1814, the found trusted data may be compared to the updated corporate policy to determine if the trusted data type is allowed. If the trusted data type is not allowed by the updated corporate policy (i.e., determination block 1814="No"), at block 1812 no action may be taken. In a further embodiment, if the trusted data type is not allowed by the updated corporate policy (i.e., determination block 1814="No"), the trusted data type may be deleted.

If the trusted data types are allowed by the updated corporate policy (i.e., determination block 1814="Yes"), in block 1816 the trusted data types may be moved to the secure memory.

Figure 18:
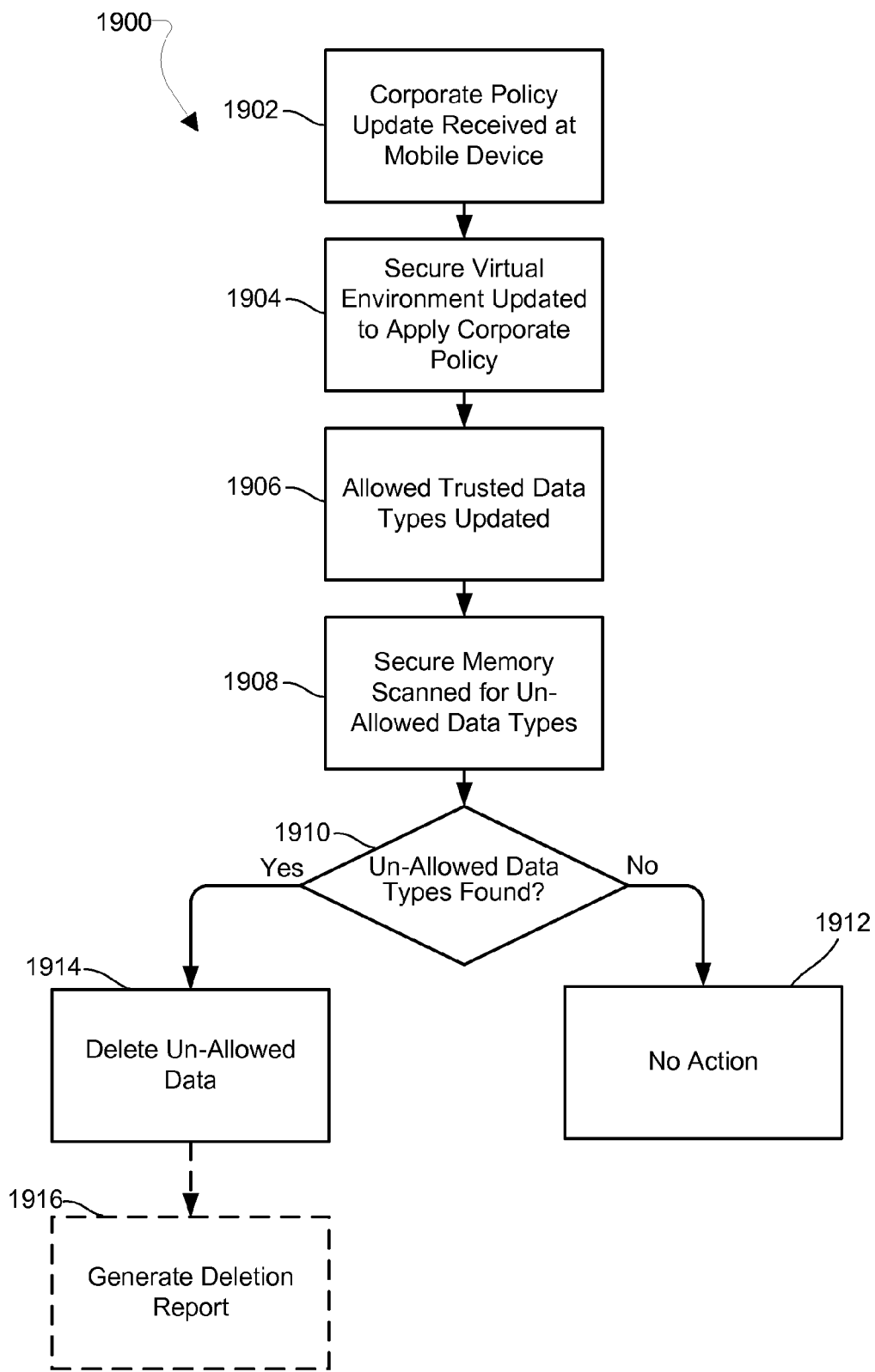
FIG. 18 is a process flow diagram illustrating the method for updating corporate policy to remove data types from a secure memory.

FIG. 18 illustrates an embodiment method 1900 for updating corporate policy to remove data types from a secure memory. This method 1900 may be may be implemented within a processor of a mobile device by configuring the processor with suitable processor-executable instructions to perform the operations of the method. At block 1902, a corporate policy update may be received at the mobile device. In this embodiment the corporate policy update includes an update of the allowed trusted data types. The corporate policy update may be received over a secure or non-secure network.

In block 1904, the secure virtual environment may be updated to apply the updated corporate policy. In block 1906, an allowed trusted data type may be updated with the updated corporate policy. This may include updating a list or table of allowed trusted data types that may function in the secure virtual environment. In this embodiment the allowed data types table may be updated by removing previously allowed trusted data types. These now un-allowed data types are no longer authorized in the secure virtual environment by the policy of the corporate entity.

At block 1908 a secure memory may be scanned for un-allowed data types. The scanning may be conducted by the secure virtual environment or other aspects of the mobile device. In determination block 1910, the processor implementing the secure virtual environment may determine whether any un-allowed data types are present on the secure memory. If un-allowed data types are not found on the secure memory (i.e., decision block 1910="No"), at block 1912 no action may be taken.

If un-allowed data types are found on the secure memory (i.e., decision block 1910="Yes"), at block 1914 the un-allowed data types may be deleted from the secure memory. In a further embodiment at block 1916 the secure virtual environment may generate a deletion report. This deletion report may be sent to the corporate entity or stored on the mobile device. A deletion report may include information as to the types of data deleted, the number or size of data deleted, the date and time of deletion, and other information related to the deletion of data.

Figure 19:
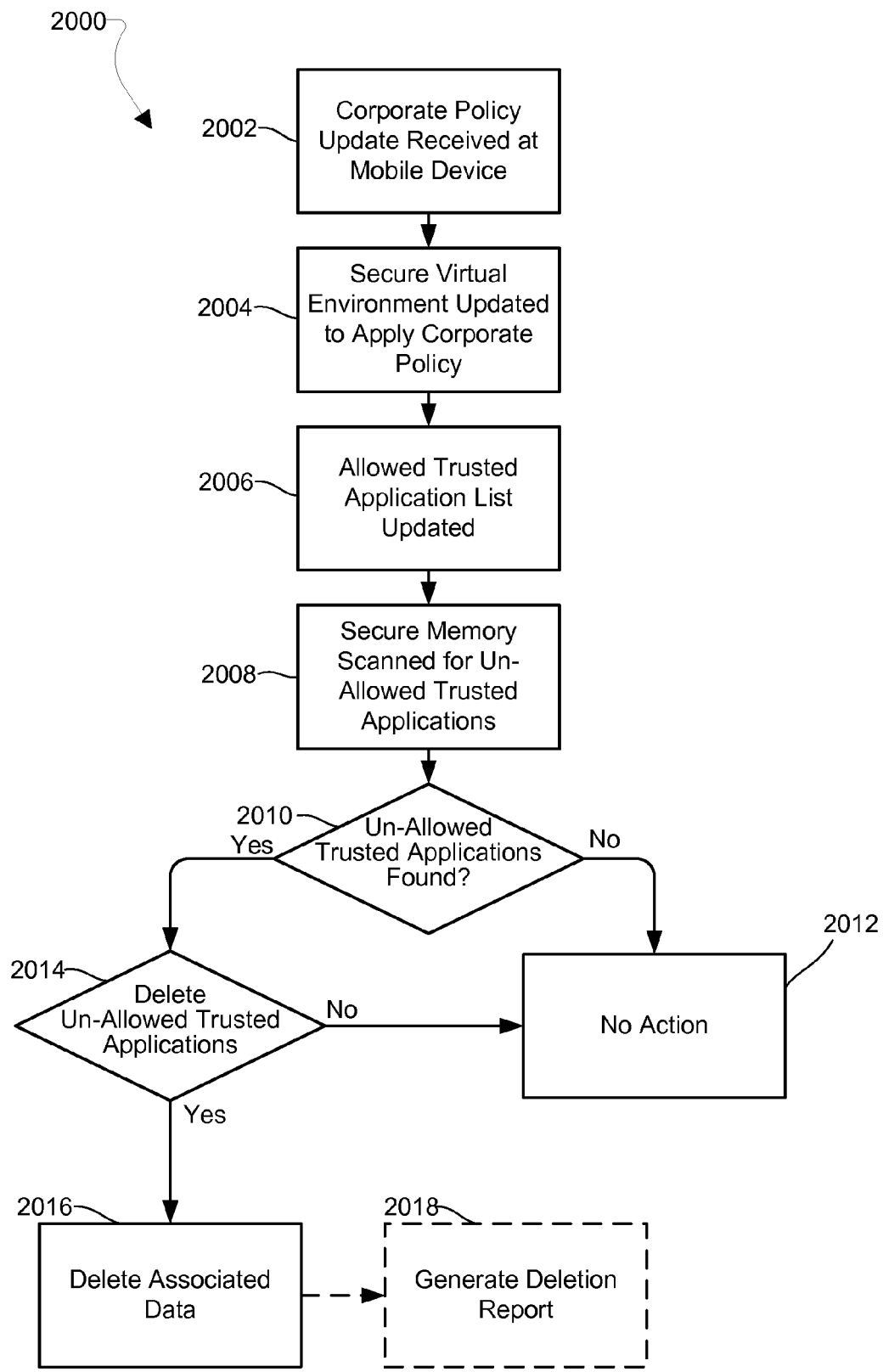
FIG. 19 is a process flow diagram of an aspect method for removing trusted applications from a mobile device after a corporate policy update.

FIG. 19 illustrates an embodiment method 2000 for removing trusted applications from a mobile device after a corporate policy update. This method 2000 may be implemented within a processor of a mobile device by configuring the processor with suitable processor-executable instructions to perform the operations of the method. At block 2002, a corporate policy update may be received at the mobile device. The corporate policy update may be received over a secure or non-secure network. In this embodiment the corporate policy update includes an update of the allowed trusted applications.

In block 2004, the secure virtual environment may be updated to apply the updated corporate policies. In block 2006, an allowed trusted application list may be updated with the updated corporate policies. This may include updating a list or table of allowed trusted applications that may function in the secure virtual environment. In this aspect the allowed trusted application list may be updated by replacing any previously allowed trusted applications list. Newly un-allowed trusted applications may be no longer authorized in the secure virtual environment by the policy of the corporate entity.

At block 2008 a secure memory may be scanned for un-allowed trusted applications. The scanning may be conducted by the secure virtual environment or other aspects of the mobile device. In determination block 2010, the processor implementing the secure virtual environment may determine whether any un-allowed trusted applications are stored on the secure memory. If un-allowed trusted applications are not found stored on the secure memory (i.e., decision block 2010="No"), at block 2012 no action may be taken.

If un-allowed trusted applications are found stored on the secure memory (i.e., decision block 2010="Yes"), at determination block 2014 the processor implementing the secure virtual environment may determine whether to delete the un-allowed trusted applications. The determination to delete un-allowed trusted applications may be made by corporate policy or based on an input received from the user. If the determination is to not delete un-allowed trusted applications (i.e., determination block 2014="No"), at block 2012 no action may be taken. If the determination is made to delete the un-allowed trusted applications (i.e., determination block 2014="Yes") the un-allowed trusted applications may be deleted from the secure memory in block 2016. In a further embodiment at block 2018 the secure virtual environment may generate a deletion report. The deletion report may be sent to the corporate entity or stored on the mobile device. A deletion report may include information as to the types of applications deleted, the number or size of applications deleted, the time and date of deletion, and other information related to the deletions.

Figures 20A, 20B:
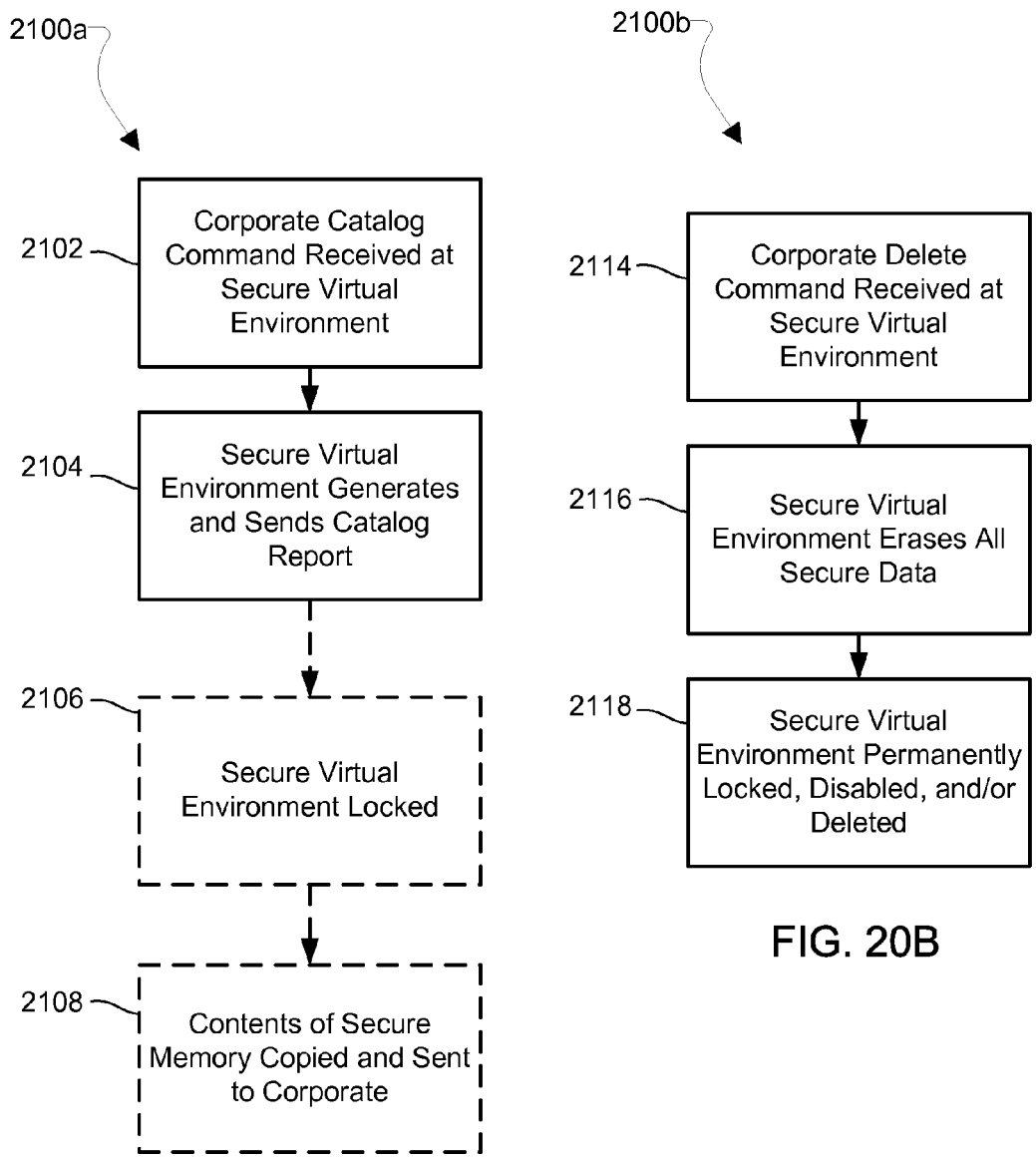
FIGS. 20A and 20B are process flow diagrams of aspect methods for conducting corporate events on a mobile device which may be directed through the secure environment application.

FIGS. 20A-B illustrate alternative embodiment methods 2100*a* and 2100*b* for conducting corporate events on a mobile device which may be directed through the secure virtual environment. FIG. 20A illustrates an embodiment 2100*a* for conducting the corporate event of provisioning a catalog command to a mobile device. Catalog commands may direct the secure virtual environment to catalog items on the mobile device. As an example, an E-Discovery request may require the corporate entity to provide information about a mobile device. To meet the requirements of the E-Discovery request, the corporate entity may use a corporate event, for example a catalog command.

This method 2100*a* may be implemented within a processor of a mobile device by configuring the processor with suitable processor-executable instructions to perform the operations of the method. In block 2102, a corporate entity catalog command may be received by the secure virtual environment. In block 2104, the processor implementing the secure virtual environment may catalog all the applications and data residing in the secure memory and/or associated with the secure virtual environment, and the processor implementing the secure virtual environment may generate a catalog report which may be sent to the corporate entity. The catalog report may include information about the nature of the data in the secure virtual memory and/or associated with the secure virtual environment. The catalog report may be sent via a secure or unsecure network. In a further embodiment, the secure virtual environment may be locked in block 2106. The locking of the secure virtual environment may occur as a result of instructions contained in the corporate catalog command. The corporate entity may have the phone locked in order to preserve data in relation to the E-Discovery request. In a further aspect, in block 2108, the contents of any secure memory on the mobile device may be copied by the processor implementing the secure virtual environment and sent to the corporate entity in response to the catalog command.

FIG. 20B illustrates an embodiment method 2100b for conducting the corporate event of securing a mobile device after a mobile device is reported stolen, sold, or an employee is terminated. If a mobile device is reported to the corporate entity as stolen, the mobile device is sold, or the employee is terminated, the corporate entity may desire to ensure the protection of corporate data on the mobile device. These three scenarios represent common situations in which corporate data needs to be removed from a mobile device, though any situation in which data is to be removed might employ the method 2100b.

This method 2100b may be implemented within a processor of a mobile device by configuring the processor with suitable processor-executable instructions to perform the operations of the method. In block 2114, the processor implementing the secure virtual environment may receive a corporate delete command. In block 2116, the processor implementing the secure virtual environment may erase all secure data on the mobile device. The secure data may include trusted applications or trusted data and any contents of a secure memory. Known methods for effectively erasing data from memory may be used. In block 2120 the secure virtual environment may be permanently locked, disabled, and/or deleted from the mobile device.

Figure 21:
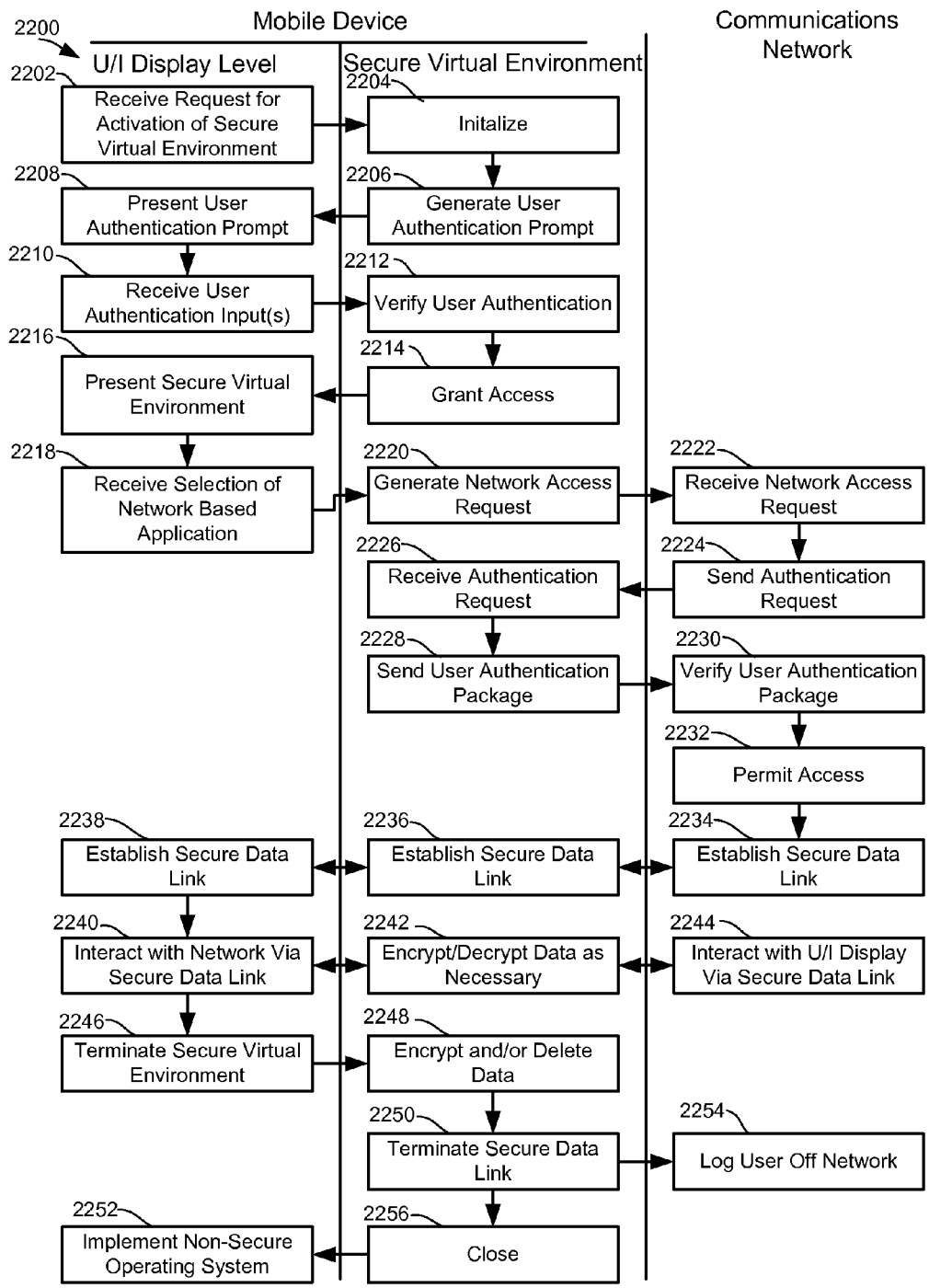
FIG. 21 is a process flow diagram of an aspect method for managing interactions between the user interface U/I display level, the secure virtual environment, and a network level.

FIG. 21 illustrates an embodiment method 2200 for managing interactions between the user interface, the secure virtual environment, and a communications network. The method 2200 may be implemented within a processor of a mobile device and the processor of a network server by configuring the processors with suitable processor-executable instructions to perform the operations of the method. Operations in the columns labeled U/I (user interface) Display Level and Secure Virtual Environment may be implemented within the processor of a mobile device, and operations in the column labeled Communications Network may be implemented within the processor of a network server, such as an enterprise server under the control of the organization providing the corporate policies described above.

In block 2202 the mobile device may receive a user request for activation of the secure virtual environment. This user input may be in the form of a user touching or clicking on an icon on the mobile device display, a drop down menu, or via any other selection method. In block 2204 the secure virtual environment initializes. As part of the initialization of the secure virtual environment, at block 2206 the secure virtual environment may generate a user authentication prompt (e.g., a password entry window) that is passed to the user interface display rendering module.

At block 2208 the user authentication prompt may be used by the user interface display level to present the prompt on the display and await an authentication input. The prompt may be in the form of a dialog box, a pop-up window, or any other form. In operation, the user may be prompted to provide a variety of authentication inputs, including user ID, password, submission to a biometric sensor, or any combination thereof. At block 2210 the user interface receives the user authentication inputs and passes the user authentication inputs to the secure virtual environment.

At block 2212, the secure virtual environment verifies the user using the received authentication inputs. Based on that verification, access may be granted to the secure virtual environment in block 2214. At block 2216, the secure virtual environment may be presented on the display.

In block 2218, the mobile device may receive a user input indicating selection of a network based application via the user interface. At block 2220, a network access request may be generated by the secure virtual environment. The network access request may be communicated to the communications network at block 2222 via a communication layer of the mobile device. Since such communications may use any known data communication hardware and protocol, internal operations and messaging associated with establishing a communication link are not shown or further described. After receiving the network access request in block 2222, the communications network (i.e., a server coupled to the network) may send an authentication request at block 2224 back to the mobile device.

The secure virtual environment may receive the authentication request in block 2226. In block 2228 the secure virtual environment may send a user authentication package for the user in the associated network back to the requesting server on the communication network. In an embodiment, the authentication package may be the user's name or ID and a code or key known only to the mobile device and the organization server which indicates that the mobile device has authenticated the user. In another embodiment, the authentication package may be some or all of the authentication inputs provided by the user. In a third embodiment, the authentication package may include both a device authentication key and user authentication inputs. At the communication network the user authentication may be verified in block 2230. After verification of the user authentication, the communication network may permit access to the servers on the communication network in block 2232.

In blocks 2234, 2236, and 2238 an encrypted data link may be established between the user interface and the communications network via the secure virtual environment, allowing the user to interact with the network via a secure data link. At blocks 2240, 2242, and 2244 the user interface may interact with the communications network via the secure data link. All interactions between the communications network and the user interface occur via the secure data link through the secure virtual environment at block 2242. At block 2242 the secure virtual environment encrypts and decrypts data as necessary at block 2242. In this manner, only secure communication between the user and the network may occur.

At block 2246 the user interface may receive a request to terminate the secure virtual environment. The user interface may also generate an automatic exit in block 2246, such as in response to user inactivity. At block 2248 all data associated with the secure virtual environment may be deleted or encrypted by the secure virtual environment. At block 2250 the secure virtual environment may terminate the secure data link. The user may also be logged off from the communications network at block 2254. At block 2256 the secure virtual environment may close. The user interface may then indicate that the non-secure operating system is implemented at block 2252.

Figure 22:
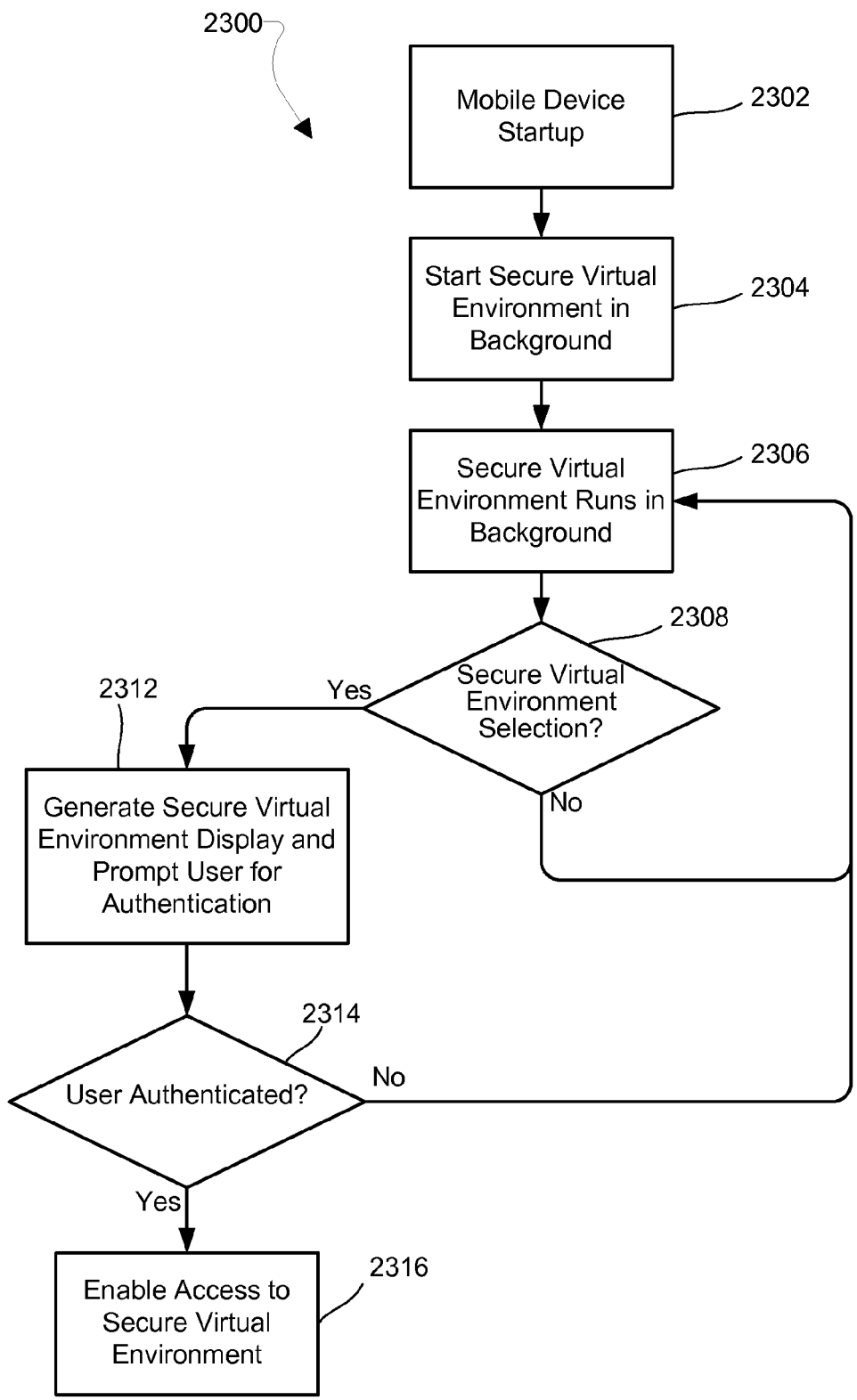
FIG. 22 is a process flow diagram of an aspect method for enabling a secure virtual environment at mobile device startup.

FIG. 22 illustrates an embodiment method 2300 for enabling a secure virtual environment upon mobile device startup. This method 2300 may be implemented within a processor of a mobile device by configuring the processor with suitable processor-executable instructions to perform the operations of the method. In block 2302, a mobile device may be started. In block 2304, the secure virtual environment may be started in the background as part of the mobile device startup routines. In block 2306, the secure virtual environment may run in the background of the mobile device.

In determination block 2308, the processor implementing the secure virtual environment may monitor signals from the user interface to determine if the secure virtual environment has been selected by a user based on user inputs. If the secure virtual environment is not selected (i.e., decision block 2308="No"), the secure virtual environment may continue to run at block 2306.

When the secure virtual environment is selected (i.e., decision block 2308="Yes"), the secure virtual environment may generate a secure virtual environment display and prompt the user for authentication inputs. The processor may receive the user requested authentication information, and at determination block 2314 the processor may determine whether the user has been authenticated such as described above. If the user is not authenticated (i.e., determination block 2314="No"), the authentication prompt and other images associated with the secure virtual environment may be removed from the display and in block 2306 the secure virtual environment may continue to run in the background. User authentication may be by any form, including input of a user ID, password, secure key, or biometric data. If the user is authenticated (i.e., decision block 2314="Yes"), at block 2316 the processor may enable access to the secure virtual environment, which may then operate as described above.

Figure 23:
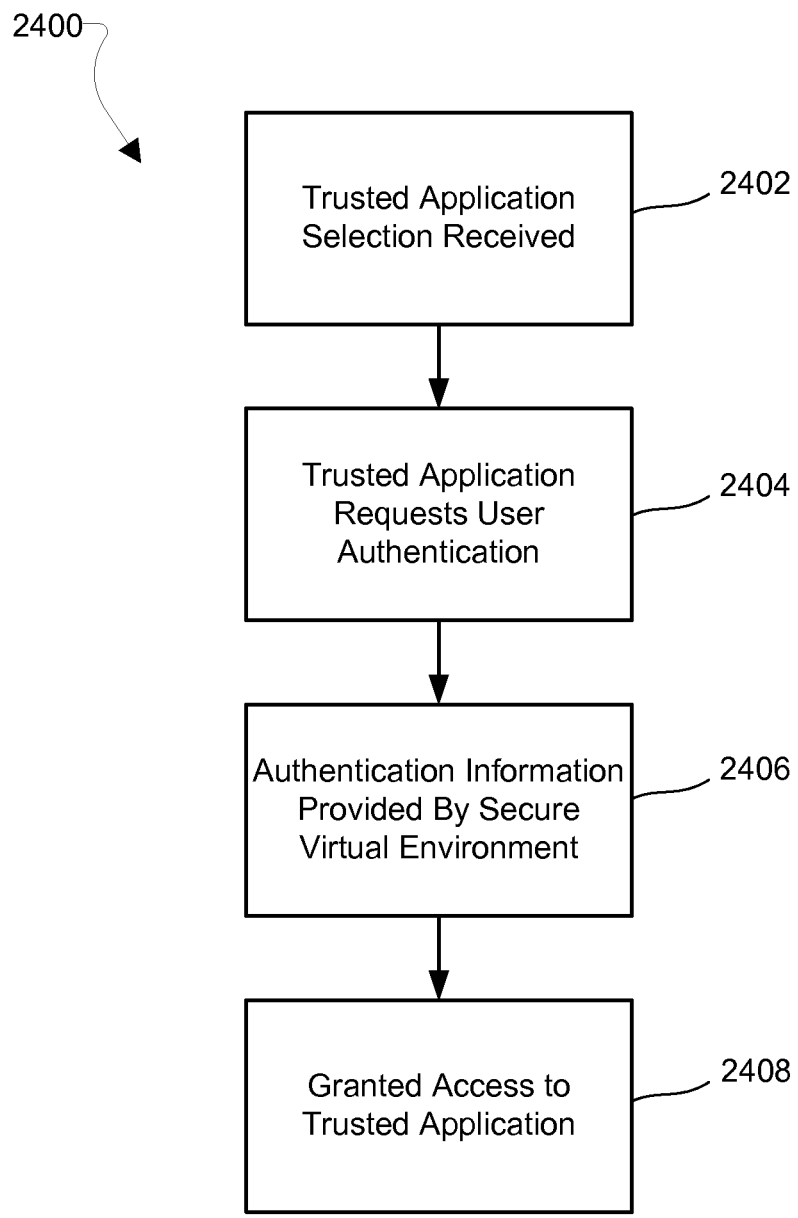
FIG. 23 is a process flow diagram of an aspect method for granting access to trusted applications without repeated user log-ins to those applications.

FIG. 23 illustrates an embodiment method 2400 that may be implemented inside the secure virtual environment for granting access to trusted applications without repeated user log-ins. This method 2400 may be implemented within a processor of a mobile device by configuring the processor with suitable processor-executable instructions to perform the operations of the method. In block 2402, a user selection of a trusted application may be received from the user interface. The user input may be in the form of a user touching or clicking on an icon on the mobile device desktop, a drop down menu, or via any other selection method.

In block 2404 the trusted application may request a form of user authentication from the secure virtual environment. This request for authentication by an application may occur for various reasons. For example, the application may include a security measure requiring user authentication before the application fully activates to prevent unauthorized users from using the application or to present a correct user profile. In an embodiment, this request for authentication may be in the form of a call to an authentication API supported by the secure virtual environment.

In block 2406 the authentication information may be provided by the secure virtual environment to the requesting application. The secure virtual environment may provide the information directly to the trusted application such as by passing data to the application, indicating authentication in a predefined memory location, or in response to an authentication API call, and therefore prevents the user from having to directly provide information. In one aspect the opening of the trusted application may appear to be automatic to the user because the user is not notified that the trusted application required user authentication. In block 2408, access may be granted to the trusted application. In this aspect, although the individual trusted application may require user authentication, as trusted applications are selected the secure virtual environment automatically provisions user information and authentication to each trusted application because the secure virtual environment stores the user ID and login information. This saves the user time because they do not have to login to each individual application as it is selected.

Figure 24:
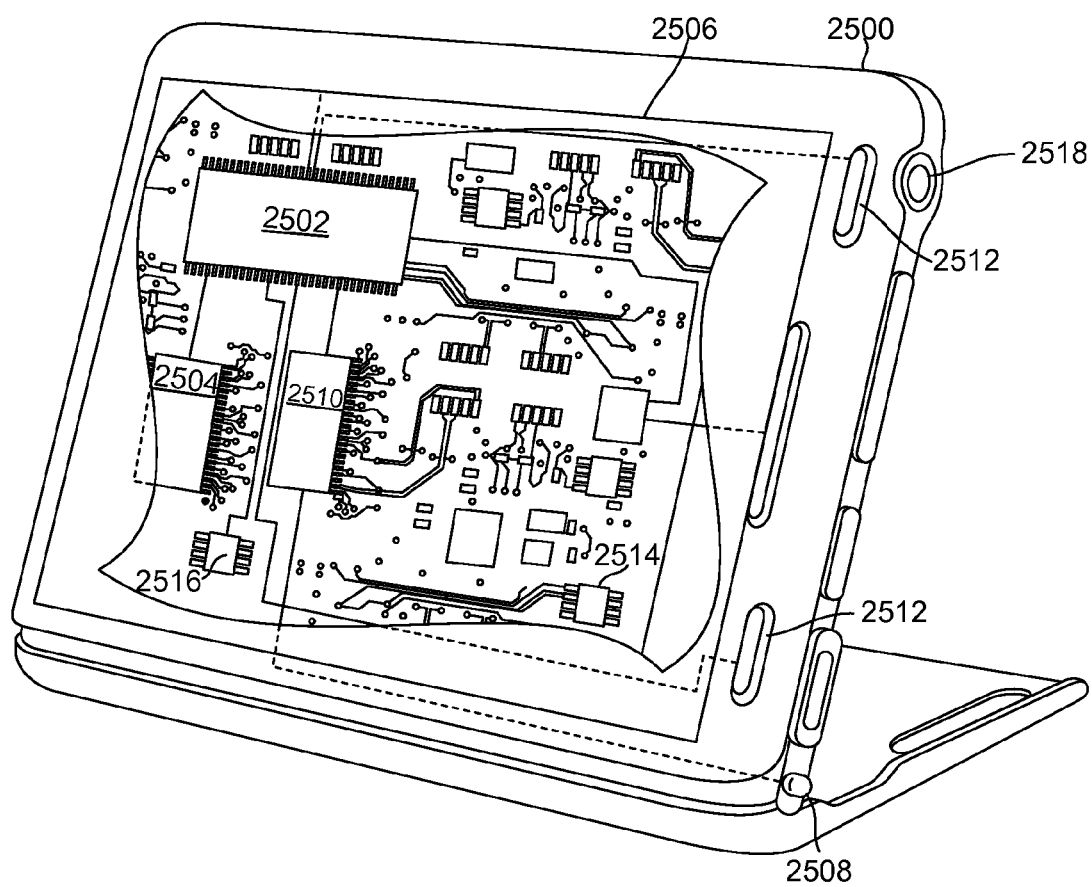
FIG. 24 is a component diagram of an example mobile device suitable for use with the various embodiments.

The various embodiments may be implemented in any of a variety of mobile devices, an example of which is illustrated in FIG. 24. For example, the mobile device 2500 may include a processor 2502 coupled to internal memories 2510 and 2504. Internal memories 2510 may be volatile or non-volatile memories, and may also be secure and/or encrypted memories, or unsecure and/or unencrypted memories, or any combination thereof. The processor 2502 may also be coupled to a touch screen display 2506, such as a resistive-sensing touch screen, capacitive-sensing touch screen infrared sensing touch screen, or the like. Additionally, the display of the mobile device need not have touch screen capability. Additionally, the mobile device 2500 may have one or more antenna 2508 for sending and receiving electromagnetic radiation that may be connected to a wireless data link and/or cellular telephone transceiver 2516 coupled to the processor 2502. The mobile device 2500 may also include physical buttons 2512 for receiving user inputs. The mobile device 2500 may also include a power button 2518 for turning the mobile device 2500 on and off. The processor 2502 may be any programmable microprocessor, microcomputer or multiple processor chip or chips that may be configured by software instructions (applications) to perform a variety of functions, including the functions of the various embodiments described below. In some mobile devices, multiple processors 2502 may be provided, such as one processor dedicated to wireless communication functions and one processor dedicated to running other applications. Typically, software applications may be stored in the internal memory 2504, 2510, before they are accessed and loaded into the processor 2502. The processor 2502 may include internal memory sufficient to store the application software instructions.

The foregoing method descriptions and the process flow diagrams are provided merely as illustrative examples, and are not intended to require or imply that the steps of the various aspects must be performed in the order presented. As will be appreciated by one of skill in the art the order of steps in the foregoing aspects may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium. The steps of a method or algorithm disclosed herein may be embodied in a processor-executable software module which may reside on a non-transitory computer-readable storage medium. Non-transitory computer-readable storage media may be any available media that can be accessed by a computer. By way of example, and not limitation, such a non-transitory computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a non-transitory machine readable medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

The invention claimed is:

1. A method for handling data on a mobile device, comprising:
   enabling access to a secure virtual environment on the mobile device, the secure virtual environment configured with a security policy;
   enabling only trusted applications to operate within the secure virtual environment according to the security policy;
   presenting a user interface with only the trusted applications;
   enabling a user to manipulate the data with a trusted application in the secure virtual environment;
   encrypting the manipulated data with the secure virtual environment before the manipulated data exits the secure virtual environment;
   storing the encrypted data according to the security policy;
   receiving a delete command;
   using the secure virtual environment to erase secure data on the mobile device in response to the delete command; and
   locking access to the secure virtual environment at the mobile device in response to the received delete command.

2. The method of claim 1, further comprising:
   receiving a selection of the secure virtual environment from the user;
   prompting the user for an authentication input;
   receiving the user authentication input; and
   verifying the user based on the received user authentication input prior to enabling access to the secure virtual environment.

3. The method of claim 1, further comprising:
   receiving a received data;
   determining if the received data is trusted data;
   determining if the received data is of a type allowed by the security policy; and
   decrypting the received data with the secure virtual environment if the received data is trusted data and is of a type allowed by the security policy.

4. The method of claim 1, further comprising:
   receiving a received data;
   determining if the received data is encrypted;
   prompting the user for an authentication input;
   receiving the user authentication input;
   verifying the user based on the received user authentication input prior to enabling access to the secure virtual environment;
   decrypting a data header with the secure virtual environment;
   determining if the received data is trusted data according to the data header;
   determining if the received data is of a type allowed by the security policy; and
   decrypting the received data with the secure virtual environment if the received data is trusted data of a type allowed by the security policy.

5. The method of claim 1, further comprising:
   receiving an application;
   using an application program interface (API)/broker to determine if the application is a trusted application;
   determining if the application is allowed by the security policy; and
   storing the application if the application is a trusted application and allowed by the security policy.

6. The method of claim 1, wherein the security policy includes one or more of: a list of applications allowed to operate in the secure virtual environment; a list of application types allowed to operate in the secure virtual environment; data manipulation restrictions in the secure virtual environment; and data storage restrictions in the secure virtual environment.

7. The method of claim 1, further comprising:
   receiving a security policy update, the security policy update containing an update to a list of trusted applications;

using the security policy update to update the security policy of the secure virtual environment;
scanning an unsecure memory of the mobile device to identify trusted applications stored on the unsecure memory;
determining if any trusted applications stored on the unsecure memory are allowed by the security policy; and
moving trusted applications stored on the unsecure memory and determined to be allowed by the security policy to a secure memory.

8. The method of claim 1, further comprising:
receiving a security policy update, the security policy update containing an update to a list of allowed applications;
using the security policy update to update the security policy of the secure virtual environment;
scanning a secure memory of the mobile device to identify applications un-allowed by the security policy; and
deleting any identified un-allowed applications.

9. The method of claim 1, further comprising:
receiving a security policy update, the security policy update containing an update to a list of trusted data types;
using the security policy update to update the security policy of the secure virtual environment;
scanning an unsecure memory of the mobile device to identify trusted data types stored on the unsecure memory;
determining if any trusted data types stored on the unsecure memory are allowed by the security policy; and
moving trusted data types stored on the unsecure memory and determined to be allowed by the security policy to a secure memory.

10. The method of claim 1, further comprising:
receiving a security policy update, the security policy update containing an update to a list of trusted data types;
using the security policy update to update the security policy of the secure virtual environment;
scanning a secure memory of the mobile device to identify data types un-allowed by the security policy; and
deleting any identified un-allowed data types.

11. The method of claim 1, wherein storing the encrypted data according to the security policy comprises storing the encrypted data in a secure portion of memory on the mobile device.

12. The method of claim 1, further comprising:
receiving a catalog command;
generating a catalog report using the secure virtual environment in response to the catalog command, the catalog report containing information about the contents of a secure memory.

13. The method of claim 12, further comprising:
locking access to the secure virtual environment in response to the received catalog command;
copying the contents of the secure memory in response to the catalog command; and
transmitting a copy of the contents of the secure memory to a server.

14. The method of claim 2, further comprising:
receiving a user input to select a network based application;
receiving a network access request from a network server; and
sending a user authentication package from the secure virtual environment to the network server, the user authentication package containing a key or code known only to the secure virtual environment and the network server used to indicate the user has been authenticated.

15. The method of claim 2, further comprising:
receiving a user input to select a network based application;
receiving a network access request from a network server; and
sending a user authentication package from the secure virtual environment to the network server, the user authentication package containing at least a portion of the user authentication input.

16. The method of claim 1, further comprising:
establishing in the secure virtual environment a secure data link between the mobile device and a server over a network; and
decrypting and encrypting data transmitted over the secure data link with the secure virtual environment.

17. The method of claim 1, further comprising:
activating the secure virtual environment at startup of the mobile device;
running the secure virtual environment in the background of the mobile device;
receiving a selection of the secure virtual environment from the user;
prompting the user for authentication input;
receiving the user authentication input; and
verifying the user based on the received user authentication input prior to enabling access to the secure virtual environment.

18. The method of claim 1, further comprising:
receiving a user input to activate the trusted application in the secure virtual environment;
receiving a user authentication request from the trusted application; and
providing user authentication information from the secure virtual environment to the trusted application.

19. A mobile device, comprising:
a memory; and
a processor coupled to the memory, wherein the processor is configured with processor-executable instructions to perform operations comprising:
enabling access to a secure virtual environment on the mobile device, the secure virtual environment configured with a security policy;
enabling only trusted applications to operate within the secure virtual environment according to the security policy;
presenting a user interface with only the trusted applications;
enabling a user to manipulate data with a trusted application in the secure virtual environment;
encrypting the manipulated data with the secure virtual environment before the manipulated data exits the secure virtual environment;
storing the encrypted data according to the security policy;
receiving a delete command;
using the secure virtual environment to erase secure data on the mobile device in response to the delete command; and
locking access to the secure virtual environment at the mobile device in response to the received delete command.

20. The mobile device of claim 19, wherein the processor is configured with processor-executable instructions to perform operations further comprising:
receiving a selection of the secure virtual environment from the user;

prompting the user for an authentication input;
receiving the user authentication input; and
verifying the user based on the received user authentication input prior to enabling access to the secure virtual environment.

21. The mobile device of claim 19, wherein the processor is configured with processor-executable instructions to perform operations further comprising:
receiving a received data;
determining if the received data is trusted data;
determining if the received data is of a type allowed by the security policy; and
decrypting the received data with the secure virtual environment if the received data is trusted data and is of a type allowed by the security policy.

22. The mobile device of claim 19, wherein the processor is configured with processor-executable instructions to perform operations further comprising:
receiving a received data;
determining if the received data is encrypted;
prompting the user for an authentication input;
receiving the user authentication input;
verifying the user based on the received user authentication input prior to enabling access to the secure virtual environment;
decrypting a data header with the secure virtual environment;
determining if the received data is trusted data according to the data header;
determining if the received data is of a type allowed by the security policy; and
decrypting the received data with the secure virtual environment if the received data is trusted data of a type allowed by the security policy.

23. The mobile device of claim 19, wherein the processor is configured with processor-executable instructions to perform operations, further comprising:
receiving an application;
using an application program interface (API)/broker to determine if the application is a trusted application;
determining if the application is allowed by the security policy; and
storing the application if the application is a trusted application and allowed by the security policy.

24. The mobile device of claim 19, wherein the processor is configured with processor executable instructions to perform operations such that the security policy includes one or more of: a list of applications allowed to operate in the secure virtual environment; a list of application types allowed to operate in the secure virtual environment; data manipulation restrictions in the secure virtual environment; and data storage restrictions in the secure virtual environment.

25. The mobile device of claim 19, wherein the memory comprises an unsecure memory and a secure memory, and wherein the processor is configured with processor-executable instructions to perform operations further comprising:
receiving a security policy update, the security policy update containing an update to a list of trusted applications;
using the security policy update to update the security policy of the secure virtual environment;
scanning the unsecure memory of the mobile device to identify trusted applications stored on the unsecure memory;
determining if any trusted applications stored on the unsecure memory are allowed by the security policy; and
moving trusted applications stored on the unsecure memory and determined to be allowed by the security policy to the secure memory.

26. The mobile device of claim 19, wherein the memory comprises an unsecure memory and a secure memory, and wherein the processor is configured with processor-executable instructions to perform operations further comprising:
receiving a security policy update, the security policy update containing an update to a list of allowed applications;
using the security policy update to update the security policy of the secure virtual environment;
scanning the secure memory of the mobile device to identify applications un-allowed by the security policy; and
deleting any identified un-allowed applications.

27. The mobile device of claim 19, wherein the memory comprises an unsecure memory and a secure memory, and wherein the processor is configured with processor-executable instructions to perform operations further comprising:
receiving a security policy update, the security policy update containing an update to a list of trusted data types;
using the security policy update to update the security policy of the secure virtual environment;
scanning the unsecure memory of the mobile device to identify trusted data types stored on the unsecure memory;
determining if any trusted data types stored on the unsecure memory are allowed by the security policy; and
moving trusted data types stored on the unsecure memory and determined to be allowed by the security policy to the secure memory.

28. The mobile device of claim 19, wherein the memory comprises an unsecure memory and a secure memory, and wherein the processor is configured with processor-executable instructions to perform operations further comprising:
receiving a security policy update, the security policy update containing an update to a list of trusted data types;
using the security policy update to update the security policy of the secure virtual environment;
scanning the secure memory of the mobile device to identify data types un-allowed by the security policy; and
deleting any identified un-allowed data types.

29. The mobile device of claim 19, wherein the processor is configured with processor-executable instructions to perform operations such that storing the encrypted data according to the security policy comprises storing the encrypted data in a secure portion of memory on the mobile device.

30. The mobile device of claim 19, wherein the processor is configured with processor executable instructions to perform operations further comprising:
receiving a catalog command;
generating a catalog report using the secure virtual environment in response to the catalog command, the catalog report containing information about the contents of a secure memory.

31. The mobile device of claim 30, wherein the processor is configured with processor-executable instructions to perform operations further comprising:
locking access to the secure virtual environment in response to the received catalog command;
copying the contents of the secure memory in response to the catalog command; and
transmitting a copy of the contents of the secure memory to a server.

32. The mobile device of claim 20, further comprising a transceiver coupled to the processor and configured to enable the processor to communicate with a network, wherein the processor is configured with processor-executable instructions to perform operations further comprising:
  receiving a user input to select a network based application;
  receiving a network access request from a network server; and
  sending a user authentication package from the secure virtual environment to the network server, the user authentication package containing a key or code known only to the secure virtual environment and the network server used to indicate the user has been authenticated.

33. The mobile device of claim 20, further comprising a transceiver coupled to the processor and configured to enable the processor to communicate with a network, wherein the processor is configured with processor-executable instructions to perform operations further comprising:
  receiving a user input to select a network based application;
  receiving a network access request from a network server; and
  sending a user authentication package from the secure virtual environment to the network server, the user authentication package containing at least a portion of the user authentication input.

34. The mobile device of claim 19, further comprising a transceiver coupled to the processor and configured to enable the processor to communicate with a network, wherein the processor is configured with processor-executable instructions to perform operations further comprising:
  establishing in the secure virtual environment a secure data link between the mobile device and a server over a network; and
  decrypting and encrypting data transmitted over the secure data link with the secure virtual environment.

35. The mobile device of claim 19, wherein the processor is configured with processor-executable instructions to perform operations further comprising:
  activating the secure virtual environment at startup of the mobile device;
  running the secure virtual environment in the background of the mobile device;
  receiving a selection of the secure virtual environment from the user;
  prompting the user for authentication input;
  receiving the user authentication input; and
  verifying the user based on the received user authentication input prior to enabling access to the secure virtual environment.

36. The mobile device of claim 19, wherein the processor is configured with processor-executable instructions to perform operations further comprising:
  receiving a user input to activate the trusted application in the secure virtual environment;
  receiving a user authentication request from the trusted application; and
  providing user authentication information from the secure virtual environment to the trusted application.

37. A mobile device, comprising:
  means for means for enabling access to a secure virtual environment on the mobile device, the secure virtual environment configured with a security policy;
  means for enabling only trusted applications to operate within the secure virtual environment according to the security policy;
  means for presenting a user interface with only the trusted applications;
  means for enabling a user to manipulate data with a trusted application in the secure virtual environment;
  means for encrypting the manipulated data with the secure virtual environment before the manipulated data exits the secure virtual environment; and
  means for storing the encrypted data according to the security policy;
  means for receiving a delete command;
  means for using the secure virtual environment to erase secure data on the mobile device in response to the delete command; and
  means for locking access to the secure virtual environment at the mobile device in response to the received delete command.

38. The mobile device of claim 37, further comprising:
  means for receiving a selection of the secure virtual environment from the user;
  means for prompting the user for an authentication input;
  means for receiving the user authentication input; and
  means for verifying the user based on the received user authentication input prior to enabling access to the secure virtual environment.

39. The mobile device of claim 37, further comprising:
  means for receiving a received data;
  means for determining if the received data is trusted data;
  means for determining if the received data is of a type allowed by the security policy; and
  means for decrypting the received data with the secure virtual environment if the received data is trusted data and is of a type allowed by the security policy.

40. The mobile device of claim 37, further comprising:
  means for receiving a received data;
  means for determining if the received data is encrypted;
  means for prompting the user for an authentication input;
  means for receiving the user authentication input;
  means for verifying the user based on the received user authentication input prior to enabling access to the secure virtual environment;
  means for decrypting a data header with the secure virtual environment;
  means for determining if the received data is trusted data according to the data header;
  means for determining if the received data is of a type allowed by the security policy; and
  means for decrypting the received data with the secure virtual environment if the received data is trusted data of a type allowed by the security policy.

41. The mobile device of claim 37, further comprising:
  means for receiving an application;
  means for using an application program interface (API)/broker to determine if the application is a trusted application;
  means for determining if the application is allowed by the security policy; and
  means for storing the application if the application is a trusted application and allowed by the security policy.

42. The mobile device of claim 37, wherein the security policy includes one or more of: a list of applications allowed to operate in the secure virtual environment; a list of application types allowed to operate in the secure virtual environment; data manipulation restrictions in the secure virtual environment; and data storage restrictions in the secure virtual environment.

43. The mobile device of claim 37, further comprising:
  means for receiving a security policy update, the security policy update containing an update to a list of trusted applications;

means for using the security policy update to update the security policy of the secure virtual environment;
means for scanning an unsecure memory of the mobile device to identify trusted applications stored on the unsecure memory;
means for determining if any trusted applications stored on the unsecure memory are allowed by the security policy; and
means for moving trusted applications stored on the unsecure memory and determined to be allowed by the security policy to a secure memory.

44. The mobile device of claim 37, further comprising:
means for receiving a security policy update, the security policy update containing an update to a list of allowed applications;
means for using the security policy update to update the security policy of the secure virtual environment;
means for scanning a secure memory of the mobile device to identify applications un-allowed by the security policy; and
means for deleting any identified un-allowed applications.

45. The mobile device of claim 37, further comprising:
means for receiving a security policy update, the security policy update containing an update to a list of trusted data types;
means for using the security policy update to update the security policy of the secure virtual environment;
means for scanning an unsecure memory of the mobile device to identify trusted data types stored on the unsecure memory;
means for determining if any trusted data types stored on the unsecure memory are allowed by the security policy; and
means for moving trusted data types stored on the unsecure memory and determined to be allowed by the security policy to a secure memory.

46. The mobile device of claim 37, further comprising:
means for receiving a security policy update, the security policy update containing an update to a list of trusted data types;
means for using the security policy update to update the security policy of the secure virtual environment;
means for scanning a secure memory of the mobile device to identify data types un-allowed by the security policy; and
means for deleting any identified un-allowed data types.

47. The mobile device of claim 37, wherein means for storing the encrypted data according to the security policy comprises means for storing the encrypted data in a secure portion of the memory on the mobile device.

48. The mobile device of claim 37, further comprising:
means for receiving a catalog command;
means for generating a catalog report using the secure virtual environment in response to the catalog command, the catalog report containing information about the contents of a secure memory.

49. The mobile device of claim 48, further comprising:
means for locking access to the secure virtual environment in response to the received catalog command;
means for copying the contents of a secure memory in response to the catalog command; and
means for transmitting a copy of the contents of the secure memory to a server.

50. The mobile device of claim 38, further comprising:
means for receiving a user input to select a network based application;
means for receiving a network access request from a network server; and
means for sending a user authentication package from the secure virtual environment to the network server, the user authentication package containing a key or code known only to the secure virtual environment and the network server used to indicate the user has been authenticated.

51. The mobile device of claim 38, further comprising:
means for receiving a user input to select a network based application;
means for receiving a network access request from a network server; and
means for sending a user authentication package from the secure virtual environment to the network server, the user authentication package containing at least a portion of the user authentication input.

52. The mobile device of claim 37, further comprising:
means for establishing in the secure virtual environment a secure data link between the mobile device and a server over a network; and
means for decrypting and encrypting data transmitted over the secure data link with the secure virtual environment.

53. The mobile device of claim 37, further comprising:
means for activating the secure virtual environment at startup of the mobile device;
means for running the secure virtual environment in the background of the mobile device;
means for receiving a selection of the secure virtual environment from the user;
means for prompting the user for authentication input;
means for receiving the user authentication input; and
means for verifying the user based on the received user authentication input prior to enabling access to the secure virtual environment.

54. The mobile device of claim 37, further comprising:
means for receiving a user input to activate the trusted application in the secure virtual environment;
means for receiving a user authentication request from the trusted application; and
means for providing user authentication information from the secure virtual environment to the trusted application.

55. A non-transitory processor-readable medium having stored thereon processor-executable instructions configured to cause a mobile device processor to perform operations comprising:
enabling access to a secure virtual environment on the mobile device, the secure virtual environment configured with a security policy;
enabling only trusted applications to operate within the secure virtual environment according to the security policy;
presenting a user interface with only the trusted applications;
enabling a user to manipulate data with a trusted application in the secure virtual environment;
encrypting the manipulated data with the secure virtual environment before the manipulated data exits the secure virtual environment;
storing the encrypted data according to the security policy;
receiving a delete command;
using the secure virtual environment to erase secure data on the mobile device in response to the delete command; and
locking access to the secure virtual environment at the mobile device in response to the received delete command.

56. The non-transitory processor-readable medium of claim 55, wherein the stored processor-executable instructions are configured to cause the mobile device processor to perform operations further comprising:
  receiving a selection of the secure virtual environment from the user;
  prompting the user for an authentication input;
  receiving the user authentication input; and
  verifying the user based on the received user authentication input prior to enabling access to the secure virtual environment.

57. The non-transitory processor-readable medium of claim 55, wherein the stored processor-executable instructions are configured to cause the mobile device processor to perform operations further comprising:
  receiving a received data;
  determining if the received data is trusted data;
  determining if the received data is of a type allowed by the security policy; and
  decrypting the received data with the secure virtual environment if the received data is trusted data and is of a type allowed by the security policy.

58. The non-transitory processor-readable medium of claim 55, wherein the stored processor-executable instructions are configured to cause the mobile device processor to perform operations further comprising:
  receiving a received data;
  determining if the received data is encrypted;
  prompting the user for an authentication input;
  receiving the user authentication input;
  verifying the user based on the received user authentication input prior to enabling access to the secure virtual environment;
  decrypting a data header with the secure virtual environment;
  determining if the received data is trusted data according to the data header;
  determining if the received data is of a type allowed by the security policy; and
  decrypting the received data with the secure virtual environment if the received data is trusted data of a type allowed by the security policy.

59. The non-transitory processor-readable medium of claim 55, wherein the stored processor-executable instructions are configured to cause the mobile device processor to perform operations further comprising:
  receiving an application;
  using an application program interface (API)/broker to determine if the application is a trusted application;
  determining if the application is allowed by the security policy; and
  storing the application if the application is a trusted application and allowed by the security policy.

60. The non-transitory processor-readable medium of claim 55, wherein the stored processor-executable instructions are configured to cause the mobile device processor to perform operations such that the security policy includes one or more of: a list of applications allowed to operate in the secure virtual environment; a list of application types allowed to operate in the secure virtual environment; data manipulation restrictions in the secure virtual environment; and data storage restrictions in the secure virtual environment.

61. The non-transitory processor-readable medium of claim 55, wherein the stored processor-executable instructions are configured to cause the mobile device processor to perform operations further comprising:
  receiving a security policy update, the security policy update containing an update to a list of trusted applications;
  using the security policy update to update the security policy of the secure virtual environment;
  scanning an unsecure memory of the mobile device to identify trusted applications stored on the unsecure memory;
  determining if any trusted applications stored on the unsecure memory are allowed by the security policy; and
  moving trusted applications stored on the unsecure memory and determined to be allowed by the security policy to a secure memory.

62. The non-transitory processor-readable medium of claim 55, wherein the stored processor-executable instructions are configured to cause the mobile device processor to perform operations further comprising:
  receiving a security policy update, the security policy update containing an update to a list of allowed applications;
  using the security policy update to update the security policy of the secure virtual environment;
  scanning a secure memory of the mobile device to identify applications un-allowed by the security policy; and
  deleting any identified un-allowed applications.

63. The non-transitory processor-readable medium of claim 55, wherein the stored processor-executable instructions are configured to cause the mobile device processor to perform operations further comprising:
  receiving a security policy update, the security policy update containing an update to a list of trusted data types;
  using the security policy update to update the security policy of the secure virtual environment;
  scanning an unsecure memory of the mobile device to identify trusted data types stored on the unsecure memory;
  determining if any trusted data types stored on the unsecure memory are allowed by the security policy; and
  moving trusted data types stored on the unsecure memory and determined to be allowed by the security policy to a secure memory.

64. The non-transitory processor-readable medium of claim 55, wherein the stored processor-executable instructions are configured to cause the mobile device processor to perform operations further comprising:
  receiving a security policy update, the security policy update containing an update to a list of trusted data types;
  using the security policy update to update the security policy of the secure virtual environment;
  scanning a secure memory of the mobile device to identify data types un-allowed by the security policy; and
  deleting any identified un-allowed data types.

65. The non-transitory processor-readable medium of claim 55, wherein the stored processor-executable instructions are configured to cause the mobile device processor to perform operations such that storing the encrypted data according to the security policy comprises storing the encrypted data in a secure portion of the memory on the mobile device.

66. The non-transitory processor-readable medium of claim 55, wherein the stored processor-executable instructions are configured to cause the mobile device processor to perform operations further comprising:

receiving a catalog command;
generating a catalog report using the secure virtual environment in response to the catalog command, the catalog report containing information about the contents of a secure memory.

67. The non-transitory processor-readable medium of claim 66, wherein the stored processor-executable instructions are configured to cause the mobile device processor to perform operations further comprising:
locking access to the secure virtual environment in response to the received catalog command;
copying the contents of a secure memory in response to the catalog command; and
transmitting a copy of the contents of the secure memory to a server.

68. The non-transitory processor-readable medium of claim 56, wherein the stored processor-executable instructions are configured to cause the mobile device processor to perform operations further comprising:
receiving a user input to select a network based application;
receiving a network access request from a network server; and
sending a user authentication package from the secure virtual environment to the network server, the user authentication package containing a key or code known only to the secure virtual environment and the network server used to indicate the user has been authenticated.

69. The non-transitory processor-readable medium of claim 56, wherein the stored processor-executable instructions are configured to cause the mobile device processor to perform operations further comprising:
receiving a user input to select a network based application;
receiving a network access request from a network server; and
sending a user authentication package from the secure virtual environment to the network server, the user authentication package containing at least a portion of the user authentication input.

70. The non-transitory processor-readable medium of claim 55, wherein the stored processor-executable instructions are configured to cause the mobile device processor to perform operations further comprising:
establishing in the secure virtual environment a secure data link between the mobile device and a server over a network; and
decrypting and encrypting data transmitted over the secure data link with the secure virtual environment.

71. The non-transitory processor-readable medium of claim 55, wherein the stored processor-executable instructions are configured to cause the mobile device processor to perform operations further comprising:
activating the secure virtual environment at startup of the mobile device;
running the secure virtual environment in the background of the mobile device;
receiving a selection of the secure virtual environment from the user;
prompting the user for authentication input;
receiving the user authentication input; and
verifying the user based on the received user authentication input prior to enabling access to the secure virtual environment.

72. The non-transitory processor-readable medium of claim 55, wherein the stored processor-executable instructions are configured to cause the mobile device processor to perform operations further comprising:
receiving a user input to activate the trusted application in the secure virtual environment;
receiving a user authentication request from the trusted application; and
providing user authentication information from the secure virtual environment to the trusted application.

* * * * *